US008593336B2

(12) United States Patent
Kajiki

(10) Patent No.: US 8,593,336 B2
(45) Date of Patent: Nov. 26, 2013

(54) CONTROL APPARATUS, RADAR DETECTION SYSTEM, AND RADAR DETECTION METHOD

(75) Inventor: Junko Kajiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 13/295,879

(22) Filed: Nov. 14, 2011

(65) Prior Publication Data

US 2012/0154200 A1 Jun. 21, 2012

(30) Foreign Application Priority Data

Dec. 17, 2010 (JP) ................................. 2010-281582

(51) Int. Cl.
*G01S 13/00* (2006.01)
*G01S 7/40* (2006.01)

(52) U.S. Cl.
USPC .............. 342/173; 342/70; 342/165; 342/174

(58) Field of Classification Search
USPC ...................... 342/70–72, 165–174
See application file for complete search history.

(56) References Cited

U.S. PATENT DOCUMENTS

| | | | | |
|---|---|---|---|---|
| 3,689,878 A | * | 9/1972 | Thieroff | 340/907 |
| 5,161,107 A | * | 11/1992 | Mayeaux et al. | 701/117 |
| 5,339,081 A | * | 8/1994 | Jefferis et al. | 342/28 |
| 5,371,718 A | * | 12/1994 | Ikeda et al. | 367/91 |
| 5,444,442 A | * | 8/1995 | Sadakata et al. | 340/916 |
| 5,485,156 A | * | 1/1996 | Manseur et al. | 342/77 |
| 5,689,264 A | * | 11/1997 | Ishikawa et al. | 342/70 |
| 5,751,211 A | * | 5/1998 | Shirai et al. | 340/435 |
| 5,774,569 A | * | 6/1998 | Waldenmaier | 382/100 |
| 5,777,564 A | * | 7/1998 | Jones | 340/917 |
| 6,075,479 A | * | 6/2000 | Kudoh | 342/70 |
| 6,087,975 A | * | 7/2000 | Sugimoto et al. | 342/70 |
| 6,111,523 A | * | 8/2000 | Mee | 340/937 |
| 6,147,637 A | * | 11/2000 | Morikawa et al. | 342/70 |

(Continued)

FOREIGN PATENT DOCUMENTS

| | | |
|---|---|---|
| JP | 11-014747 | 1/1999 |
| JP | 2007-51888 | 3/2007 |
| KR | 10-2002-0074485 | 9/2002 |
| KR | 10-2009-0065187 | 6/2009 |

OTHER PUBLICATIONS

Patent Abstracts of Korean Publication, No. 2002-0074485, published Sep. 30, 2002.

(Continued)

*Primary Examiner* — Jack W Keith
*Assistant Examiner* — Peter Bythrow
(74) *Attorney, Agent, or Firm* — Staas & Halsey LLP

(57) ABSTRACT

In a control apparatus, an acquisition unit acquires the coordinates of a detection starting position and detection ending position detected by a radar, for each of a plurality of moving vehicles moving along a road. A calculation unit calculates an average value of the coordinates of the detection starting positions and an average value of the coordinates of the detection ending positions, and stores information of radar detection including the calculated average values in a radar detection storage unit. A comparison unit compares the average values of the coordinates of the detection starting positions and detection ending positions with respective determined reference values. An abnormality determination unit determines based on the comparison results whether or not an abnormality has occurred in the radar, and outputs, if determining that an abnormality has occurred, information indicative of the occurrence of the abnormality.

11 Claims, 20 Drawing Sheets

(56) References Cited

U.S. PATENT DOCUMENTS

| | | | |
|---|---|---|---|
| 6,317,081 B1 * | 11/2001 | Stilp | 342/387 |
| 6,437,731 B1 * | 8/2002 | Henrio et al. | 342/165 |
| 6,492,944 B1 * | 12/2002 | Stilp | 342/387 |
| 6,650,984 B1 * | 11/2003 | Rao et al. | 701/45 |
| 6,728,617 B2 * | 4/2004 | Rao et al. | 701/45 |
| RE38,870 E * | 11/2005 | Hall | 701/301 |
| 7,737,882 B2 * | 6/2010 | Matsuoka | 342/109 |
| 7,859,452 B2 * | 12/2010 | Schantz et al. | 342/174 |
| 7,990,313 B2 * | 8/2011 | Nalezinski et al. | 342/200 |
| 2002/0054210 A1 * | 5/2002 | Glier et al. | 348/149 |
| 2002/0189875 A1 * | 12/2002 | Asanuma et al. | 180/169 |
| 2003/0103197 A1 * | 6/2003 | Shirai et al. | 356/5.01 |
| 2004/0227661 A1 * | 11/2004 | Godsy | 342/70 |
| 2004/0246171 A1 * | 12/2004 | Orr et al. | 342/174 |
| 2005/0017891 A1 * | 1/2005 | Kuroda et al. | 342/70 |
| 2005/0128133 A1 * | 6/2005 | Samukawa et al. | 342/70 |
| 2005/0219530 A1 * | 10/2005 | Horibe et al. | 356/399 |
| 2005/0280575 A1 * | 12/2005 | Shima | 342/174 |
| 2006/0055583 A1 * | 3/2006 | Orr et al. | 342/20 |
| 2006/0077093 A1 * | 4/2006 | Steinbauer | 342/141 |
| 2008/0012752 A1 * | 1/2008 | Okamura et al. | 342/165 |
| 2008/0030396 A1 * | 2/2008 | Shima | 342/88 |
| 2009/0045999 A1 * | 2/2009 | Samukawa et al. | 342/70 |
| 2010/0057293 A1 * | 3/2010 | Hoetzer et al. | 701/34 |
| 2011/0234450 A1 * | 9/2011 | Sakai et al. | 342/70 |
| 2012/0290184 A1 * | 11/2012 | Suzuki | 701/93 |

OTHER PUBLICATIONS

Patent Abstracts of Korean Publication, No. 10-2009-0065187, published Jun. 22, 2009.

Korean Office Action issued Jan. 28, 2013 in corresponding Korean Patent Application No. 10-2011-0129533.

Patent Abstracts of Japan, Publication No. 11-14747, Published Jan. 22, 1999.

Patent Abstracts of Japan, Publication No. 2007-51888, Published Mar. 1, 2007.

* cited by examiner

FIG. 6

TRACKING TABLE

| ID | DETECTION START COORDINATE | DETECTION END COORDINATE | SPEED | RECEIVING POWER |
|---|---|---|---|---|
| 000001 | S1 | E1 | VL1 | VO1 |
| 000002 | S2 | E2 | VL2 | VO2 |
| 000003 | S3 | E3 | VL3 | VO3 |
| ⋮ | ⋮ | ⋮ | ⋮ | ⋮ |

TRACKING COLLECTION TABLE 152a

| MOVING VEHICLE NUMBER | TOTAL DETECTION START COORDINATE | TOTAL DETECTION END COORDINATE | TOTAL RECEIVING POWER |
|---|---|---|---|
| N | TS | TE | TVO |

FIG. 8

RADAR DETECTION TABLE 153a

| INTERVAL | AVERAGE DETECTION START COORDINATE | AVERAGE DETECTION END COORDINATE | AVERAGE RECEIVING POWER |
|---|---|---|---|
| S1 | AS1 | AE1 | AVO1 |
| S2 | AS2 | AE2 | AVO2 |
| S3 | AS3 | AE3 | AVO3 |
| ⋮ | ⋮ | ⋮ | ⋮ |

CONTROL APPARATUS, RADAR DETECTION SYSTEM, AND RADAR DETECTION METHOD

CROSS-REFERENCE TO RELATED APPLICATION

This application is based upon and claims the benefit of priority of the prior Japanese Patent Application No. 2010-281582, filed on Dec. 17, 2010, the entire contents of which are incorporated herein by reference.

FIELD

The embodiments discussed herein are related to a control apparatus, a radar detection system, and a radar detection method.

BACKGROUND

In order to detect conditions under which vehicles are moving along a road, the technique of an infrastructure-mounted radar or the like has traditionally been used. For example, a radar, such as a milliwave radar, is mounted at a position which overlooks a road for detecting moving vehicles.

For example, the use of such a technique makes it possible to detect traffic conditions on a road, such as vehicles moving along the road, traffic congestion caused due to temporary stopping of a vehicle or long stopping of a vehicle due to an accident or the like, and measured traffic volume, in order to manage road conditions. In addition, it is possible to inform succeeding vehicles and the like of the road conditions by the use of a display unit or the like mounted beside the road, in order to prevent an accident.

Furthermore, a technique for detecting a variation of radar mounting by the use of two radars is known as a technique for detecting a positional variation of vehicle-mounted radar mounting. In this case, one radar performs detection in an upper area and the other radar performs detection in a lower area. These areas overlap and the overlap area is parallel to a road surface (see, for example, Japanese Laid-open Patent Publication No. 11-14747). With this technique a moving object such as another vehicle is to be detected in the overlap area if the radars are mounted in normal positions. On the other hand, if a radar changes its angle upward or downward, a moving object is also detected outside the overlap area, which means a variation of radar mounting.

An infrastructure-mounted radar, for example, may be used for a decade or even longer. Therefore, it is desirable that radar maintenance be unneeded. From this point of view, a scannerless radar in which an angle between a transmission antenna plane and a receiving antenna plane is fixed and does not need changing at vehicle detection time is preferable to a mechanical scan type radar in which an angle between a transmission antenna plane and a receiving antenna plane is physically changed at vehicle detection time. Furthermore, in scannerless radars, radars using an antenna beam of narrow width (narrow beam radars) are preferable because they have higher receiving power than wide beam radars and are capable of sharply detecting the position of an object.

Such a narrow beam radar, however, may fail to cover a desired detection area due to a variation of angle of the radar. Therefore, the angle of radar mounting needs to be checked if it is always correct.

The technique disclosed in the above Japanese Laid-open Patent Publication No. 11-14747 uses two radars for detecting a positional variation although one radar is sufficient for the original purpose, which is not economical.

In addition, it is desirable from the viewpoint of easy maintenance that the occurrence of an abnormality of a radar, such as a variation of an mounting angle, is detected only based on data outputted therefrom without actually inspecting the radar.

SUMMARY

According to an aspect of the invention, there is provided a control apparatus including: a radar detection storage unit which stores information of radar detection; an acquisition unit which acquires coordinates of a detection starting position and coordinates of a detection ending position detected by a radar, for each of a plurality of moving vehicles moving in a moving direction on a road, the radar provided so as to have a detection area in the moving direction on the road; a calculation unit which calculates an average value of the coordinates of the detection starting positions acquired by the acquisition unit and an average value of the coordinates of the detection ending positions acquired by the acquisition unit and which stores the information of radar detection including the calculated average values in the radar detection storage unit; a comparison unit which compares the average value of the coordinates of the detection starting positions indicated by the information of radar detection stored in the radar detection storage unit with a determined reference value for the detection starting positions and which compares the average value of the coordinates of the detection ending positions indicated by the information of radar detection stored in the radar detection storage unit with a determined reference value for the detection ending positions; and an abnormality determination unit which determines on the basis of results of the comparisons by the comparison unit whether or not an abnormality has occurred in the radar.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 indicates a tracking table in the second embodiment;

FIG. 7 indicates a tracking collection table in the second embodiment;

FIG. 8 indicates a radar detection table in the second embodiment;

DESCRIPTION OF EMBODIMENTS

Embodiments will now be described with reference to the accompanying drawings.

First Embodiment

Figure 1:
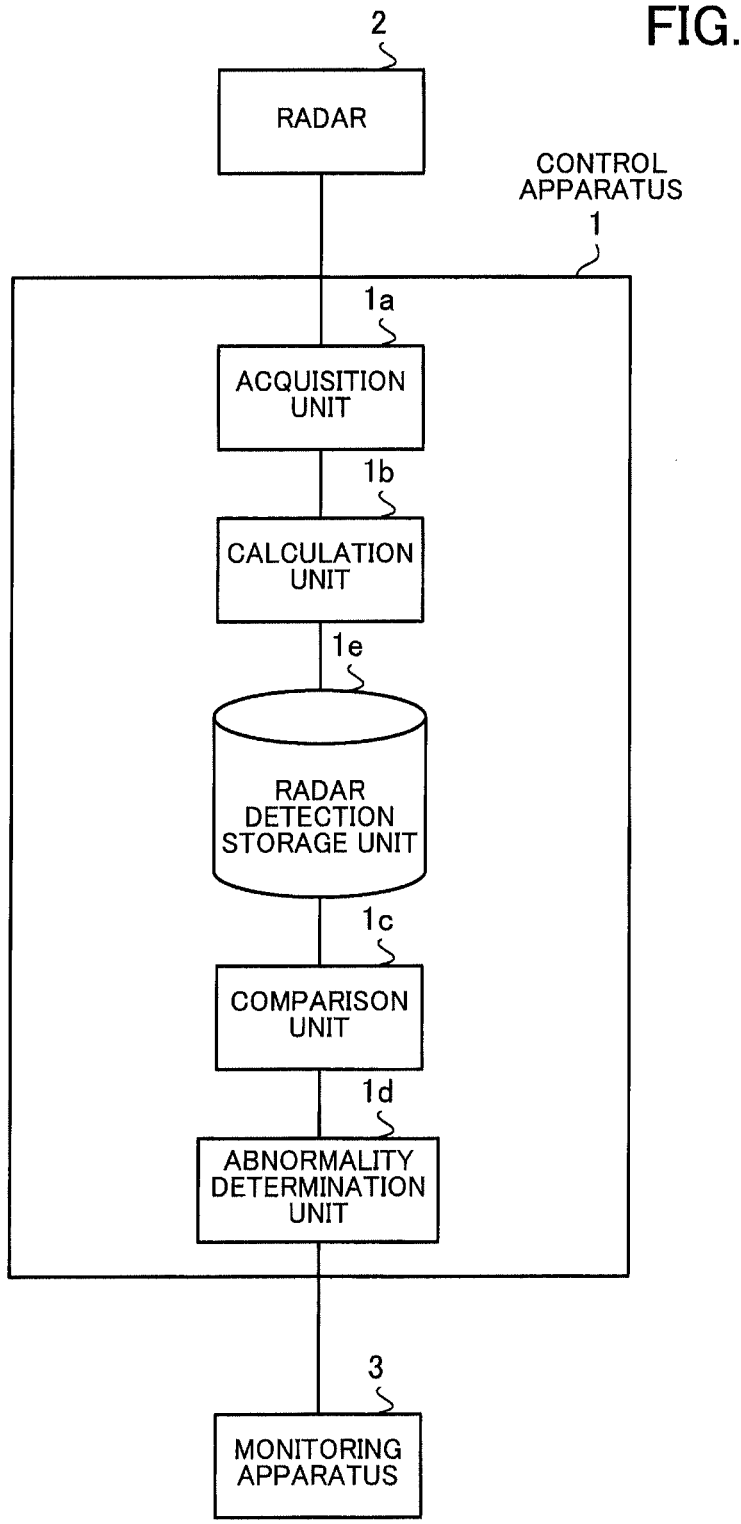
FIG. 1 illustrates a control apparatus according to a first embodiment.

FIG. 1 illustrates a control apparatus according to a first embodiment. In a radar detection system which uses an infrastructure-mounted radar usable for measuring traffic volume and the like, a control apparatus 1 according to a first embodiment collects results of detecting objects, such as vehicle which are moving on a road, detected by a radar 2, and determines whether or not an abnormality has occurred in the radar 2. The control apparatus 1 includes an acquisition unit 1a, a calculation unit 1b, a comparison unit 1c, an abnormality determination unit 1d, and a radar detection storage unit 1e. The control apparatus 1 and a monitoring apparatus 3 are connected via a communication line.

The acquisition unit 1a acquires the coordinates of a detection starting position and the coordinates of a detection ending position detected by the radar, for each of a plurality of vehicles which move along a road.

The calculation unit 1b calculates an average value of the coordinates of the detection starting positions acquired by the acquisition unit 1a and an average value of the coordinates of the detection ending positions acquired by the acquisition unit 1a, and stores information of radar detection indicative of the calculated average values in the radar detection storage unit 1e.

The comparison unit 1c compares the average value of the coordinates of the detection starting positions indicated by the information of radar detection stored in the radar detection storage unit 1e with a determined reference value for detection starting positions, and compares the average value of the coordinates of the detection ending positions indicated by the information of radar detection stored in the radar detection storage unit 1e with a determined reference value for detection ending positions.

On the basis of the results of the comparisons by the comparison unit 1c, the abnormality determination unit 1d determines whether or not an abnormality, such as a variation of a mounting angle or dirt, has occurred in the radar 2. If the abnormality determination unit 1d determines that an abnormality has occurred in the radar 2, then the abnormality determination unit 1d outputs information indicative of the occurrence of the abnormality. Abnormalities in the radar 2 to be detected in this embodiment include a variation of a mounting angle, adhesion of dirt to a radome, or the like which exerts an influence, such as an increase in deviation or variation, on a detection result.

The radar detection storage unit 1e stores information of radar detection. The information of radar detection is used for determining whether or not an abnormality has occurred in the radar 2. For example, the information of radar detection includes the calculated average value of the coordinates of the detection starting positions and the calculated average value of the coordinates of the detection ending positions.

The radar 2 detects a moving vehicle by transmitting and receiving radio waves by the use of antennas. The radar 2 has a detection area along a moving direction on a road. The radar 2 is connected to the control apparatus 1. The radar 2 detects the position and speed at detection time of a moving vehicle which is an object of detection, the receiving power at receiving time of radio waves reflected from the moving vehicle, and the like and transmits data indicating the detection results to the control apparatus 1.

When the monitoring apparatus 3 receives information indicative of the occurrence of an abnormality from the abnormality determination unit 1d, the monitoring apparatus 3 stores information indicative of the abnormality in the radar 2 and informs a manager of the radar detection system that the abnormality has occurred in the radar 2.

As has been described, the control apparatus 1 calculates an average value of the coordinates of detection starting positions acquired and an average value of the coordinates of detection ending positions acquired, compares the calculated average value of the coordinates of the detection starting positions with a determined reference value for detection starting positions, compares the calculated average value of the coordinates of the detection ending positions with a determined reference value for detection ending positions, and determines on the basis of the comparison results whether or not an abnormality, such as a variation of a mounting angle or dirt, has occurred in the radar 2. This approach makes it possible to monitor the radar 2 for an abnormality on the basis of the results of detecting objects of detection received from the radar 2, thus detecting a deterioration in the performance of the radar 2.

Second Embodiment

The following describes a second embodiment in which the function of the control apparatus 1 of FIG. 1 for detecting a deterioration in the performance of a radar is realized by a control apparatus 100.

Figure 2:
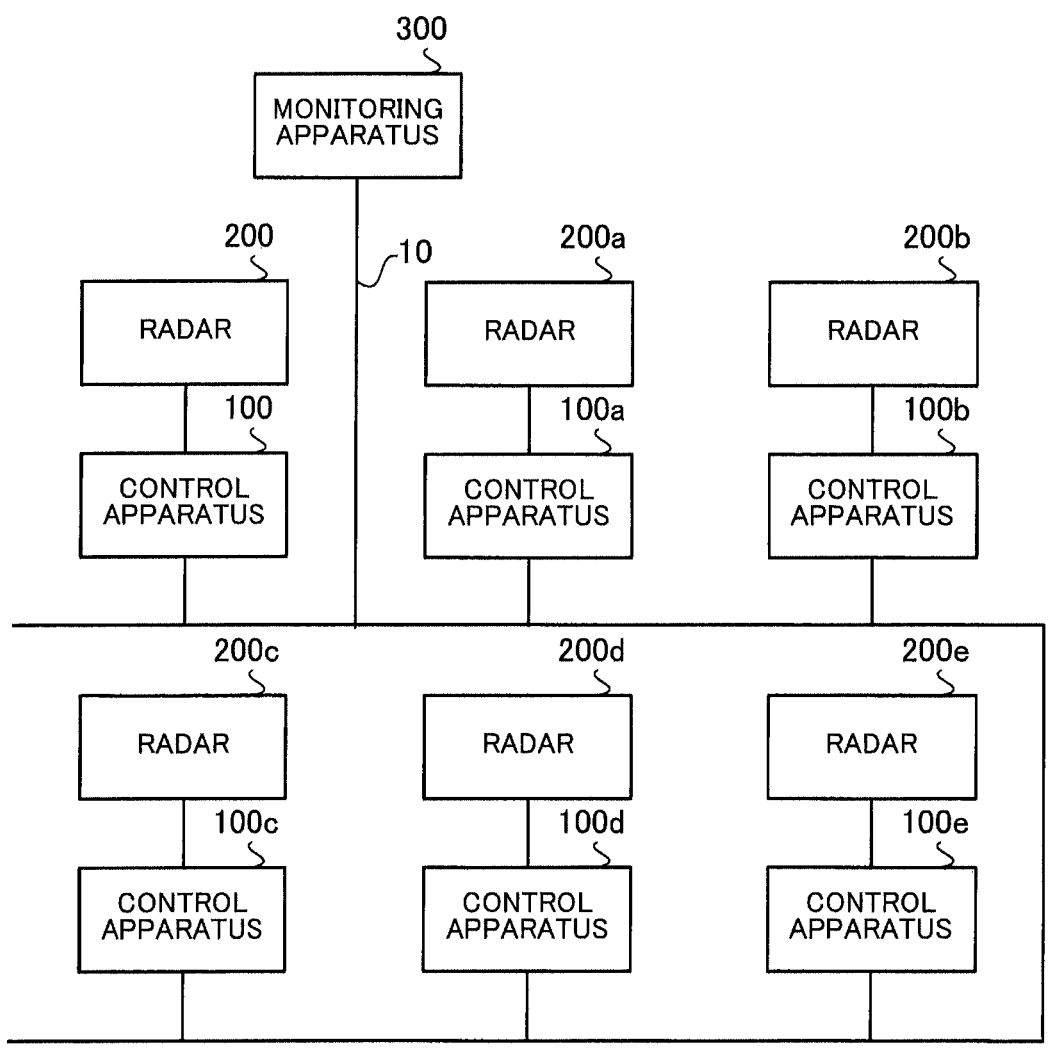
FIG. 2 illustrates the structure of a system according to a second embodiment.

FIG. 2 illustrates the structure of a system according to a second embodiment. A radar detection system of FIG. 2 uses infrastructure-mounted radars, is usable for traffic volume measurement and the like, and includes control apparatus 100, 100a, 100b, 100c, 100d, and 100e, radars 200, 200a, 200b, 200c, 200d, and 200e, and a monitoring apparatus 300. The control apparatus 100, 100a, 100b, 100c, 100d, and 100e and the monitoring apparatus 300 are connected via a network 10, such as a LAN (Local Area Network), so that they can communicate with one another.

The control apparatus 100 is connected to the radar 200. The control apparatus 100 controls the radar 200, acquires data indicative of the detection result of a moving vehicle detected by the radar 200, totalizes the data acquired, and transmits a totalization result to the monitoring apparatus 300. The control apparatus 100a through 100e have the same structure as the control apparatus 100 has, and are connected to the radars 200a through 200e respectively.

The radar 200 is mounted at such a position as to overlook a road which is an object of management, and is a milliwave radar which detects a moving vehicle. In order to detect a moving vehicle on the whole of the road, the radar 200 is mounted at each monitoring point over the road which is an object of management. If the road has a plurality of lanes, the radar 200 is mounted for each lane. The radar 200 acquires the position and speed of a moving vehicle on the road by transmitting and receiving millimeter waves and processing data. The radar 200 transmits data indicative of a detection result of the moving vehicle detected to the control apparatus 100 connected thereto. In this embodiment an FM-CW radar which is comparatively simple in structure and which is suitable for speed measurement is used as the radar 200. However, a pulse radar, a 2-frequency CW radar, an SS (Spread Spectrum) radar, or the like may be used as the radar 200.

The monitoring apparatus 300 totalizes data transmitted from the control apparatus 100, 100a, 100b, 100c, 100d, and 100e. The monitoring apparatus 300 is an upper computer connected to the control apparatus 100, 100a, 100b, 100c, 100d, and 100e. The monitoring apparatus 300 controls the entire detection system and totalizes and manages the results of detection by the radars 200, 200a, 200b, 200c, 200d, and 200e. In addition, when the monitoring apparatus 300 receives from the control apparatus 100, 100a, 100b, 100c, 100d, or 100e a notice to the effect that an abnormality has occurred in the corresponding radar 200, 200a, 200b, 200c, 200d, or 200e, the monitoring apparatus 300 creates a log to the effect that the abnormality has occurred, and displays a message on a monitor connected to the monitoring apparatus 300 for giving a manager of the radar detection system a notice of the occurrence of the abnormality.

In this embodiment the control apparatus 100, 100a, 100b, 100c, 100d, and 100e and the radars 200, 200a, 200b, 200c, 200d, and 200e are mounted on a one-to-one basis. However, one control apparatus may control a plurality of radars. Furthermore, the monitoring apparatus 300 monitors all of the control apparatus 100, 100a, 100b, 100c, 100d, and 100e and the radars 200, 200a, 200b, 200c, 200d, and 200e included in the radar detection system. However, the radar detection system may include a plurality of monitoring apparatus to adopt redundant structure.

Figure 3:
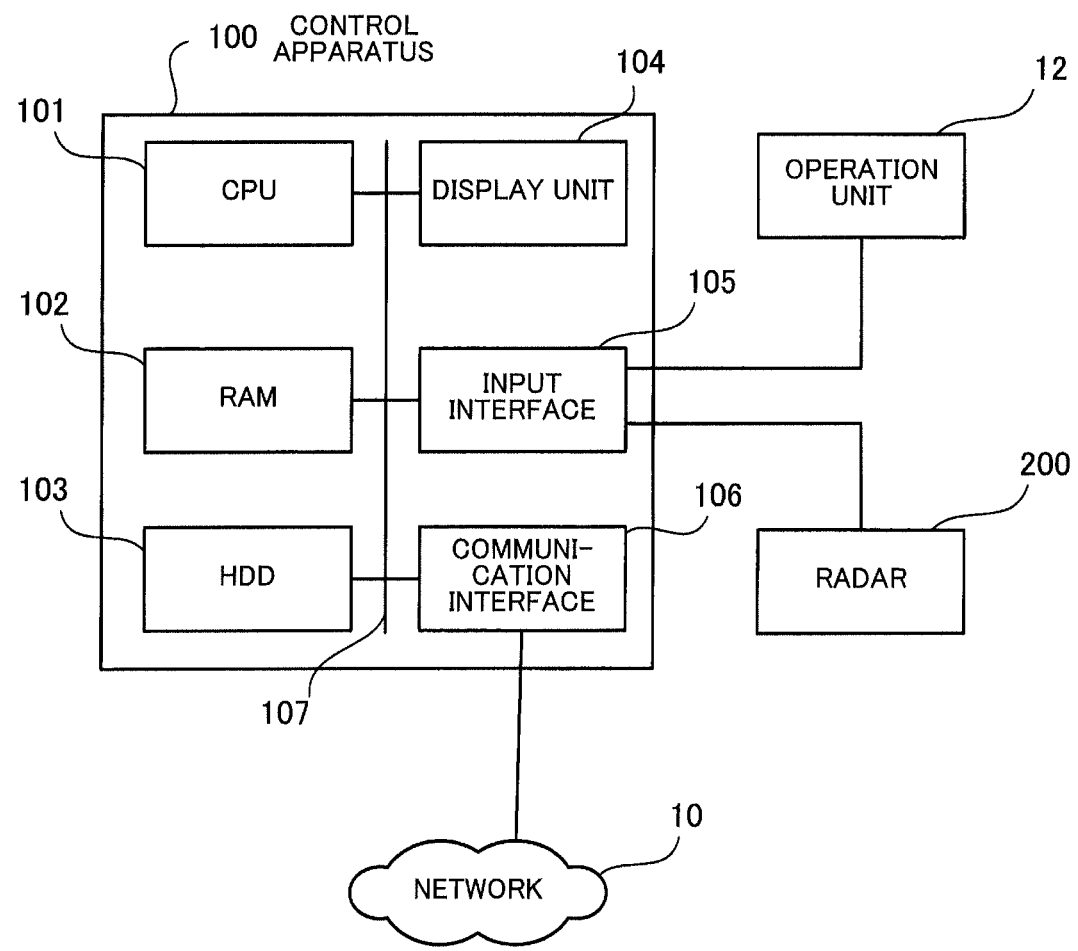
FIG. 3 illustrates the hardware configuration of a control apparatus in the second embodiment.

FIG. 3 illustrates the hardware configuration of the control apparatus in the second embodiment. The whole of the control apparatus 100 is controlled by a CPU (Central Processing Unit) 101. A RAM (Random Access Memory) 102 and a plurality of peripheral devices are connected to the CPU 101 via a bus 107.

The RAM 102 is used as main storage of the control apparatus 100. The RAM 102 temporarily stores at least part of an operating system (OS) or an application program executed by the CPU 101. The RAM 102 also stores various pieces of data which the CPU 101 needs to perform a process.

The plurality of peripheral devices connected to the bus 107 include HDD (Hard Disk Drive) 103, a display unit 104, an input interface 105, and a communication interface 106.

The HDD 103 magnetically writes data to and reads out data from a built-in disk. The HDD 103 is used as auxiliary storage of the control apparatus 100. The HDD 103 stores the OS, application programs, and various pieces of data. A semiconductor memory such as a flash memory may be used as auxiliary storage.

A light-emitting lamp (not illustrated) and a monitor (not illustrated) are connected to the display unit 104. In accordance with instructions from the CPU 101, the display unit 104 turns on an LED or displays an image on a screen of the monitor. A light bulb, an LED (Light-Emitting Diode), or the like is used as the light-emitting lamp. A display unit using a CRT (Cathode Ray Tube), a liquid crystal display, or the like is used as the monitor.

An operation unit 12 and the radar 200 are connected to the input interface 105. The input interface 105 transfers a signal received from the operation unit 12 or the radar 200 to the CPU 101. The operation unit 12 may have buttons. With the operation unit 12 an arbitrary operation method, such as a keyboard or a touch panel, may be adopted.

The communication interface 106 is connected to a network 10. The communication interface 106 transmits data to and receives data from another computer, such as the monitoring apparatus 300, or a communication device via the network 10.

FIG. 3 illustrates the hardware configuration of the control apparatus 100. The control apparatus 100a, 100b, 100c, 100d, and 100e may have the identical hardware configuration to the control apparatus 100.

Figure 4:
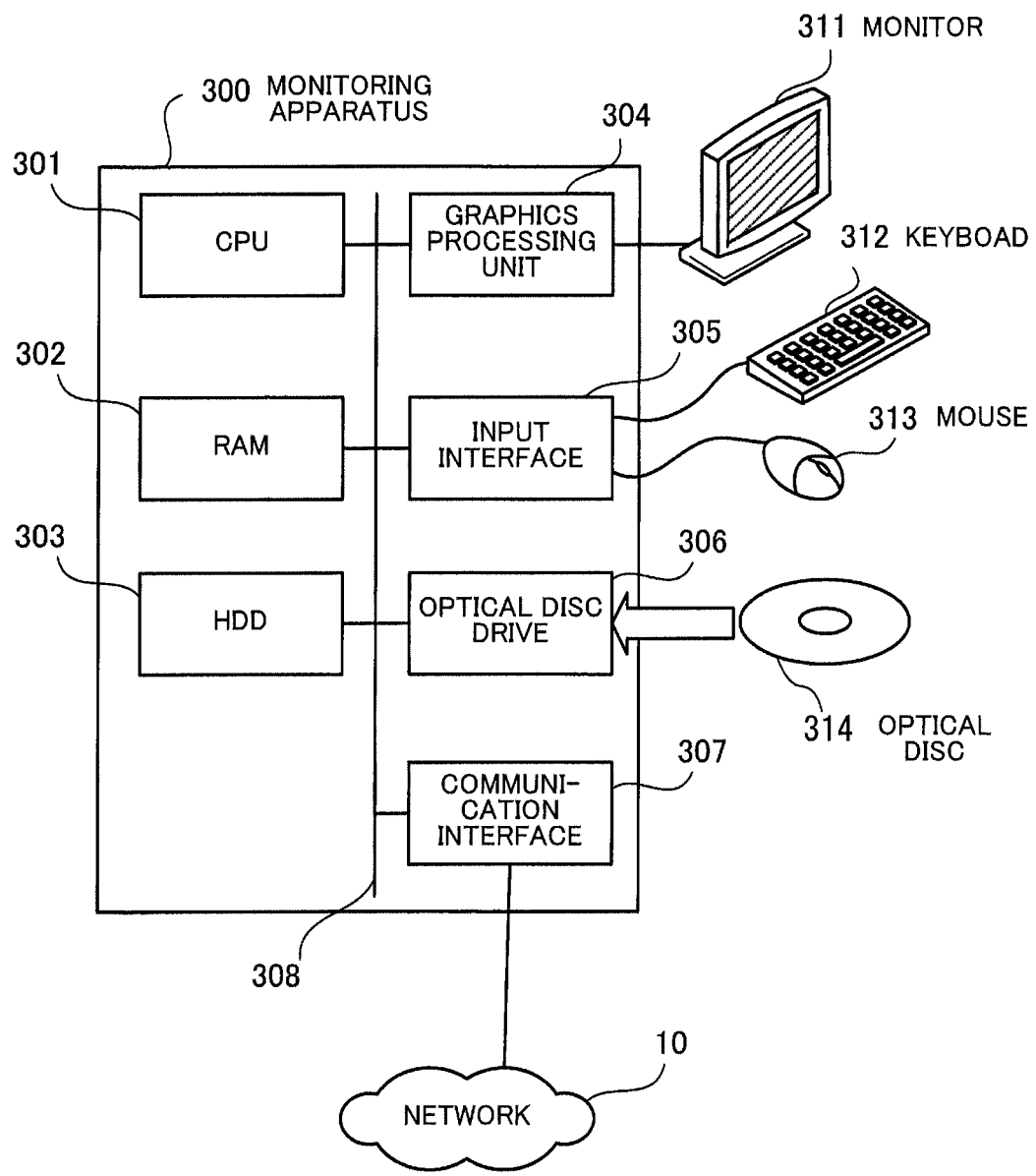
FIG. 4 illustrates the hardware configuration of a monitoring apparatus in the second embodiment.

FIG. 4 illustrates the hardware configuration of the monitoring apparatus in the second embodiment. The whole of the monitoring apparatus 300 is controlled by a CPU 301. A RAM 302 and a plurality of peripheral devices are connected to the CPU 301 via a bus 308.

The RAM 302 is used as main storage of the monitoring apparatus 300. The RAM 302 temporarily stores at least part of an OS or an application program executed by the CPU 301. The RAM 302 also stores various pieces of data which the CPU 301 needs to perform a process.

The plurality of peripheral devices connected to the bus 308 include HDD 303, a graphics processing unit 304, an input interface 305, an optical disk drive 306, and a communication interface 307.

The HDD 303 magnetically writes data to and reads out data from a built-in disk. The HDD 303 is used as auxiliary storage of the monitoring apparatus 300. The HDD 303 stores the OS, application programs, and various pieces of data. A semiconductor memory such as a flash memory is usable as auxiliary storage.

A monitor 311 is connected to the graphics processing unit 304. In accordance with instructions from the CPU 301, the graphics processing unit 304 displays an image on a screen of the monitor 311. A display unit using a CRT, a liquid crystal display, or the like is used as the monitor 311.

A keyboard 312 and a mouse 313 are connected to the input interface 305. The input interface 305 transmits a signal transmitted from the keyboard 312 or the mouse 313 to the CPU 301. The mouse 313 is an example of a pointing device and another pointing device such as a touch panel, a tablet, a touch pad, or a track ball may be used.

The optical disk drive 306 reads data recorded on an optical disk 314 by the use of, for example, a laser beam. The optical disk 314 is a portable record medium on which data is recorded so as to be read by the reflection of light. The optical disk 314 may be a DVD (Digital Versatile Disk), a DVD-RAM, a CD-ROM (Compact Disk Read Only Memory), a CD-R (Recordable)/RW (ReWritable), or the like.

The communication interface 307 is connected to the network 10. The communication interface 307 transmits data to and receives data from another computer, such as the control apparatus 100, or a communication device via the network 10.

By adopting above hardware configuration, processing functions in this embodiment can be realized.

Figure 5:
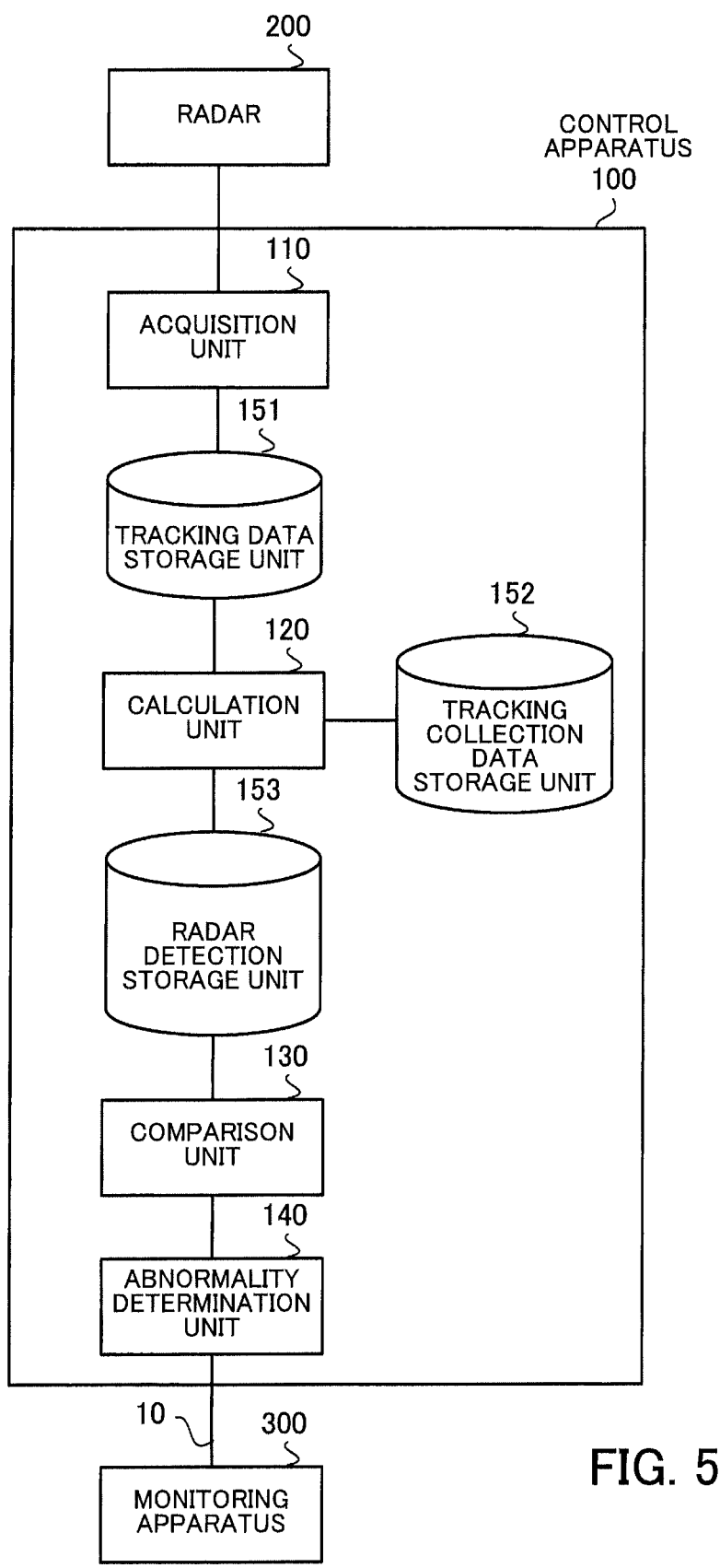
FIG. 5 is a block diagram of the functions of the control apparatus in the second embodiment.

FIG. 5 is a block diagram of the functions of the control apparatus in the second embodiment. The control apparatus 100 included in the radar detection system according to this embodiment which uses the infrastructure-mounted radars and which is usable for traffic volume measurement and the like collects the detection result of an object, such as a moving vehicle on a road, detected by the radar 200, determines whether or not an abnormality has occurred in the radar 200, and gives the monitoring apparatus 300 a notice of an abnormality detected. The control apparatus 100 and the monitoring apparatus 300 are connected via the network 10. In addition, the control apparatus 100 is connected to the radar 200.

The control apparatus 100 includes an acquisition unit 110, a calculation unit 120, a comparison unit 130, an abnormality determination unit 140, a tracking data storage unit 151, a tracking collection data storage unit 152, and a radar detection storage unit 153. The control apparatus 100 and the monitoring apparatus 300 are connected via a communication line.

The acquisition unit 110 acquires the coordinates of a detection starting position and the coordinates of a detection ending position detected by the radar 200, for each of a plurality of vehicles which move on a road.

The acquisition unit 110 acquires, for each of a plurality of vehicles which move along the road, the coordinates of a detection starting position and the coordinates of a detection ending position detected by the radar 200 having a detection area in a moving direction on the road, and receiving power of a radio wave reflected from the vehicle, generates tracking data indicative of the acquired results, and stores the generated tracking data in the tracking data storage unit 151.

Regarding each interval during which a determined number of moving vehicles are detected, the calculation unit 120 calculates the average value of the coordinates of detection starting positions acquired by the acquisition unit 110, the average value of the coordinates of detection ending positions acquired by the acquisition unit 110, and the average value of receiving power of radio waves reflected from the moving vehicles acquired by the acquisition unit 110, on the basis of the tracking data stored in the tracking data storage unit 151

At this time the calculation unit 120 generates tracking collection data for each interval, and stores the generated tracking collection data in the tracking collection data storage unit 152. Then, each time the radar 200 newly detects a moving vehicle and tracking data is generated, the calculation unit 120 adds detection results indicated in the generated tracking data to tracking collection data for a corresponding interval stored in the tracking collection data storage unit 152. When the corresponding interval ends, the calculation unit 120 calculates an average for the results of each detection by dividing a total value for the results of the detection by the number of moving vehicles.

In addition, the calculation unit 120 stores information of radar detection indicative of the calculated average values in the radar detection storage unit 153. Alternatively, when a determined period of time taken as an interval elapses, the calculation unit 120 may calculate the average value of the coordinates of detection starting positions acquired by the acquisition unit 110, the average value of the coordinates of detection ending positions acquired by the acquisition unit 110, and the average value of receiving power acquired by the acquisition unit 110, and store information of radar detection indicative of the calculated average values in the radar detection storage unit 153.

The comparison unit 130 calculates an average range of vehicle detection distance which is the absolute value of the difference between an average value of the coordinates of detection starting positions indicated by information of radar detection stored in the radar detection storage unit 153 and an average value of the coordinates of detection ending positions indicated by the information of radar detection stored in the radar detection storage unit 153. In addition, the comparison unit 130 compares the average value of the coordinates of the detection starting positions indicated by the information of radar detection stored in the radar detection storage unit 153 with a determined reference value for the detection starting positions. Furthermore, the comparison unit 130 compares the average value of the coordinates of the detection ending positions indicated by the information of radar detection stored in the radar detection storage unit 153 with a determined reference value for the detection ending positions. Moreover, the comparison unit 130 compares an average value of receiving power indicated by the information of radar detection stored in the radar detection storage unit 153 with a determined reference value for the receiving power. In addition, the comparison unit 130 compares the calculated average range of vehicle detection distance with a determined reference value for the average range of vehicle detection distance.

The determined reference value for the detection starting positions is set on the basis of a detection starting position set at radar mounting time. The determined reference value for the detection ending positions is set on the basis of a detection ending position set at the radar mounting time. The determined reference value for the receiving power is set on the basis of receiving power set at the radar mounting time. The determined reference value for the average range of vehicle detection distance is set on the basis of the detection starting position and the detection ending position set at the radar mounting time. In this connection, the determined reference value for the detection starting positions may be set on the basis of the average value of detection starting positions calculated in the past by the calculation unit 120. The determined reference value for the detection ending positions may be set on the basis of the average value of detection ending positions calculated in the past by the calculation unit 120. The determined reference value for the receiving power may be set on the basis of the average value of receiving power calculated in the past by the calculation unit 120. The determined reference value for the average range of vehicle detection distance may be set on the basis of the average value of detection starting positions and the average value of detection ending positions calculated in the past by the calculation unit 120.

On the basis of the results of the comparisons made by the comparison unit 130, the abnormality determination unit 140 determines whether or not a variation of angle of radar mounting has occurred. If the abnormality determination unit 140 determines that a variation of angle of radar mounting has occurred, then the abnormality determination unit 140 outputs information indicative of the occurrence of the variation. On the basis of the results of the comparisons made by the comparison unit 130, the abnormality determination unit 140 may determine whether or not there is dirt on a radome of the radar. If the abnormality determination unit 140 determines that there is dirt on the radome of the radar, then the abnormality determination unit 140 outputs information indicative of adhesion of the dirt. Abnormalities to be detected in the radar 200 in this embodiment include a variation of angle of the radar 200, adhesion of dirt to the radome, and the like which exerts an influence, such as an increase in deviation or variation, on a detection result.

The tracking data storage unit 151 stores tracking data. The tracking data indicates the detection result of each moving vehicle detected by the radar 200, and includes coordinates indicative of the positions at detection start time and detection end time of each moving vehicle detected by the radar 200, its speed at detection time, receiving power of a radio wave reflected at the detection time, and the like.

The tracking collection data storage unit 152 stores tracking collection data. The tracking collection data indicates a totalization result for moving vehicles detected by the radar 200 in a determined interval (in a certain period of time or in a period in which a certain number of vehicles run by, for example), and includes the number of moving vehicles detected in the determined interval, the total value of the coordinates at detection start time of the moving vehicles in the determined interval, the total value of the coordinates at detection end time of the moving vehicles in the determined interval, the total value of the receiving power of radio waves reflected from the moving vehicles in the determined interval, and the like. The tracking collection data also includes a moving vehicle number indicative of the number of moving vehicles detected in the determined interval.

The radar detection storage unit 153 stores information of radar detection. The information of radar detection is used for determining whether or not an abnormality has occurred in the radar 200, and includes, for example, the calculated average value of the coordinates of detection starting positions and the calculated average value of the coordinates of detection ending positions.

The radar 200 detects a moving vehicle by transmitting and receiving radio waves by the use of antennas. The radar 200 has a detection area along a moving direction on a road. The radar 200 is connected to the control apparatus 100. The radar 200 detects the position and speed at detection time of a moving vehicle which is an object of detection, the receiving power at receiving time of radio waves reflected from the moving vehicle, and the like, and transmits data indicative of a detection result to the control apparatus 100.

The radar 200 includes a transmission antenna for transmitting a radio wave and a receiving antenna for receiving a radio wave. Radio waves emitted from the transmission antenna of the radar 200 toward an object of detection, such as a moving vehicle, are reflected. Radio waves reflected from the object of detection are received by the receiving antenna of the radar 200. At this time the distance between the radar 200 and the object of detection and the relative speed of the object of detection relative to the radar 200 is detected by delay time from the transmission of radio waves from the radar 200 to the object of detection to the receiving by the radar 200 of radio waves reflected from the object of detection. The absolute speed of the radar 200 is 0, so the relative speed detected is considered as the absolute speed of the object of detection. In addition, a direction in which the object of detection is moving is confirmed from whether the relative speed is positive or negative.

Furthermore, the radar 200 detects the intensity of reflections from the object of detection (receiving power value). In addition, each antenna of the radar 200 has a transmission and receiving area which are adjustable in a vertical or horizontal direction. The radar 200 detects an object which exists in this area and within a radar detection distance.

The radar 200 is mounted over the road for detecting a moving vehicle. For example, a narrow beam radar using an antenna beam of narrow width may be used as the radar 200. In this case, a narrow beam radar is highly directional. Therefore, in order to fully exploit the performance of the radar for detecting a vehicle, it is necessary to correctly keep a radar mounting angle. Moreover, it is necessary to always keep the radome of the radar in a state in which a foreign substance does not stick thereto.

Once the radar detection system begins to operate to detect moving vehicles by the use of the radar 200 mounted over the road, this radar detection system may be in operation for a decade or even longer. If an abnormality, such as a variation from an original mounting direction or adhesion of a foreign substance to the radome, occurs in the radar 200 for some reason or other during the operation of the radar 200, then the performance of the radar detection system which is originally expected may not be realized.

If such abnormality is not recognized and the radar 200 continues to operate without the direction corrected, then the expected performance may not be realized.

When the monitoring apparatus 300 receives information which indicates the occurrence of an abnormality, from the abnormality determination unit 140, the monitoring apparatus 300 stores information indicative of the abnormality in the radar 200 and informs the manager of the radar detection system that the abnormality has occurred in the radar 200.

In the radar detection system according to this embodiment the radar 200 detects the position and speed of a moving vehicle, which is an object of detection, and the receiving power of radio waves reflected from the moving vehicle at determined intervals, and transmits data indicative of a detection result to the control apparatus 100. The control apparatus 100 acquires the data transmitted from the radar 200 by the acquisition unit 110 and stores tracking data indicative of the detection result in the tracking data storage unit 151. At this time the control apparatus 100 identifies each moving vehicle on the basis of the tracking data and exercises management by assigning the same ID to the same vehicle. By doing so, the result of time series detection of moving vehicles is obtained.

Each time a certain period of time elapses or a certain number of moving vehicles are detected, the control apparatus 100 then calculates the average value of detection starting positions, the average value of detection ending positions, the average value of receiving power, and the like on the basis of the tracking data stored in the tracking data storage unit 151, and stores them in the radar detection storage unit 153. The control apparatus 100 repeats this process to continue to accumulate information of radar detection.

In addition, at determined opportunities, for example each time a certain period of time elapses, the control apparatus 100 determines from a variation in the average value of detection starting positions, the average value of detection ending positions, the average value of receiving power, or the like on the basis of accumulated information of radar detection whether or not an abnormality has occurred in the radar 200. If the variation in the average value of the detection starting positions, the average value of the detection ending positions, the average value of the receiving power, or the like becomes bigger both in the short term and in the long term and a tendency to return to a value before the variation is not recognized, then the abnormality determination unit 140 determines that an abnormality has occurred in the radar 200, and, for example, gives the manager a notice.

FIG. 6 indicates a tracking table in the second embodiment. A tracking table 151*a* indicated in FIG. 6 is stored in the tracking data storage unit 151 of the control apparatus 100. Data which indicates results of detection by the radar 200 and which is acquired by the acquisition unit 110 is written to the tracking table 151*a*. The tracking table 151*a* stores tracking data indicative of the results of the detection of moving vehicles by the radar 200.

The tracking table 151*a* includes ID, Detection Start Coordinate, Detection End Coordinate, Speed, and Receiving Power items. In the tracking table 151*a* pieces of information in these items arranged in the horizontal direction are associated with one another as tracking data.

ID is a number assigned to each moving vehicle detected in order to uniquely identify the moving vehicle detected by the radar 200. Each time a new moving vehicle is detected by the radar 200, new tracking data is set for a detection result and new ID is assigned to the tracking data set.

A detection start coordinate is a value indicative of a coordinate acquired first in detecting a moving vehicle. In this embodiment the radar 200 is mounted so that the direction of radio waves emitted from the radar 200 will match the direction in which a moving vehicle which is an object of detection runs. Accordingly, the coordinate of a moving vehicle detected by the radar 200 is indicated as a one-dimensional coordinate on a coordinate axis parallel to the direction of radio waves emitted from the radar 200.

A detection end coordinate is a value indicative of a coordinate acquired last in detecting a moving vehicle. A detection start coordinate and a detection end coordinate indicate both ends of detection limits at the time of detecting a moving vehicle by the radar 200.

Speed is a value indicative of the speed of a moving vehicle detected at detection time. A value obtained by one arbitrary measurement at the time of detecting a moving vehicle or the average value of values obtained by measurements at detection time may be used as the value of speed to be included in tracking data. Furthermore, a result of dividing the distance between a detection start coordinate and a detection end coordinate by time from detection start time to detection end time measured may be used as the value of speed to be included in tracking data.

Receiving power is a value indicative of the receiving power of radio waves which are reflected from a moving vehicle and which are detected at the time of detecting the moving vehicle. A value obtained by one arbitrary measurement at the time of detecting a moving vehicle or the average value of values obtained by measurements at detection time may be used as the value of receiving power to be included in tracking data.

FIG. 7 indicates a tracking collection table in the second embodiment. A tracking collection table 152*a* indicated in FIG. 7 is stored in the tracking collection data storage unit 152 of the control apparatus 100. The result of the totalization of tracking data in a determined interval by the calculation unit 120 is written to the tracking collection table 152*a*. The tracking collection table 152*a* stores tracking data indicative of a totalization result in a determined interval regarding a moving vehicle detected by the radar 200.

The tracking collection table 152*a* includes Moving Vehicle Number, Total Detection Start Coordinate, Total Detection End Coordinate, and Total Receiving Power items. In the tracking collection table 152*a* pieces of information in these items arranged in the horizontal direction are associated with one another as tracking data.

A moving vehicle number is a value indicative of the number of moving vehicles detected in a determined interval by the radar 200. Each time a new moving vehicle is detected by the radar 200, a moving vehicle number is incremented. Furthermore, a moving vehicle number is set to "0" at first in the determined interval. In this embodiment the calculation unit 120 totalizes tracking data in each interval set by the determined time (10 minutes, for example). Alternatively, the calculation unit 120 may totalize tracking data in each interval set by the determined number of (100, for example) moving vehicles.

A total detection start coordinate is the total of coordinates acquired first in detecting moving vehicles in a determined interval. Each time a new moving vehicle is detected by the radar 200 and a detection start coordinate is acquired, the calculation unit 120 adds a value indicative of the acquired detection start coordinate to a total detection start coordinate.

A total detection end coordinate is the total of coordinates acquired last in detecting moving vehicles in a determined interval. Each time a new moving vehicle is detected by the radar 200 and a detection end coordinate is acquired, the calculation unit 120 adds a value indicative of the acquired detection end coordinate to a total detection end coordinate.

Total receiving power is the total of the receiving power of radio waves which are reflected from moving vehicles in a determined interval and which are detected at the time of detecting the moving vehicles. Each time a new moving vehicle is detected by the radar 200 and receiving power is acquired, the calculation unit 120 adds a value indicative of the acquired receiving power to total receiving power.

FIG. 8 indicates a radar detection table in the second embodiment. A radar detection table 153*a* indicated in FIG. 8 is stored in the radar detection storage unit 153 of the control apparatus 100. An average obtained from a totalization result in each interval is written to the radar detection table 153*a* on the basis of tracking data in each interval obtained by totalization by the calculation unit 120. The radar detection table 153*a* stores information of radar detection indicative of a representative value (average, for example) of a totalization result in each interval obtained by totalization by the calculation unit 120.

The radar detection table 153*a* includes Interval, Average Detection Start Coordinate, Average Detection End Coordinate, and Average Receiving Power items. In the radar detection table 153*a* pieces of information in these items arranged in the horizontal direction are associated with one another as information of radar detection.

An interval is information indicative of each interval in which detection results are totalized by the calculation unit 120. In this embodiment, as stated above, each interval is set by the determined time by the calculation unit 120. Each interval may be set by the determined number of moving vehicles.

An average detection start coordinate is the average value of coordinates acquired first in detecting moving vehicles in each interval. The calculation unit 120 calculates an average detection start coordinate by dividing a total detection start coordinate by a moving vehicle number in each interval on the basis of tracking data in each interval.

An average detection end coordinate is the average value of coordinates acquired last in detecting moving vehicles in each interval. The calculation unit 120 calculates an average detection end coordinate by dividing a total detection end coordinate by a moving vehicle number in each interval on the basis of tracking data in each interval.

Average receiving power is the average value of the receiving power of radio waves which are reflected from moving vehicles in each interval and which are detected at the time of detecting the moving vehicles. The calculation unit 120 calculates average receiving power by dividing total receiving power by a moving vehicle number in each interval on the basis of tracking data in each interval.

FIGS. 9 through 12 illustrate vehicle detection by the radar in the second embodiment.

Figure 9:
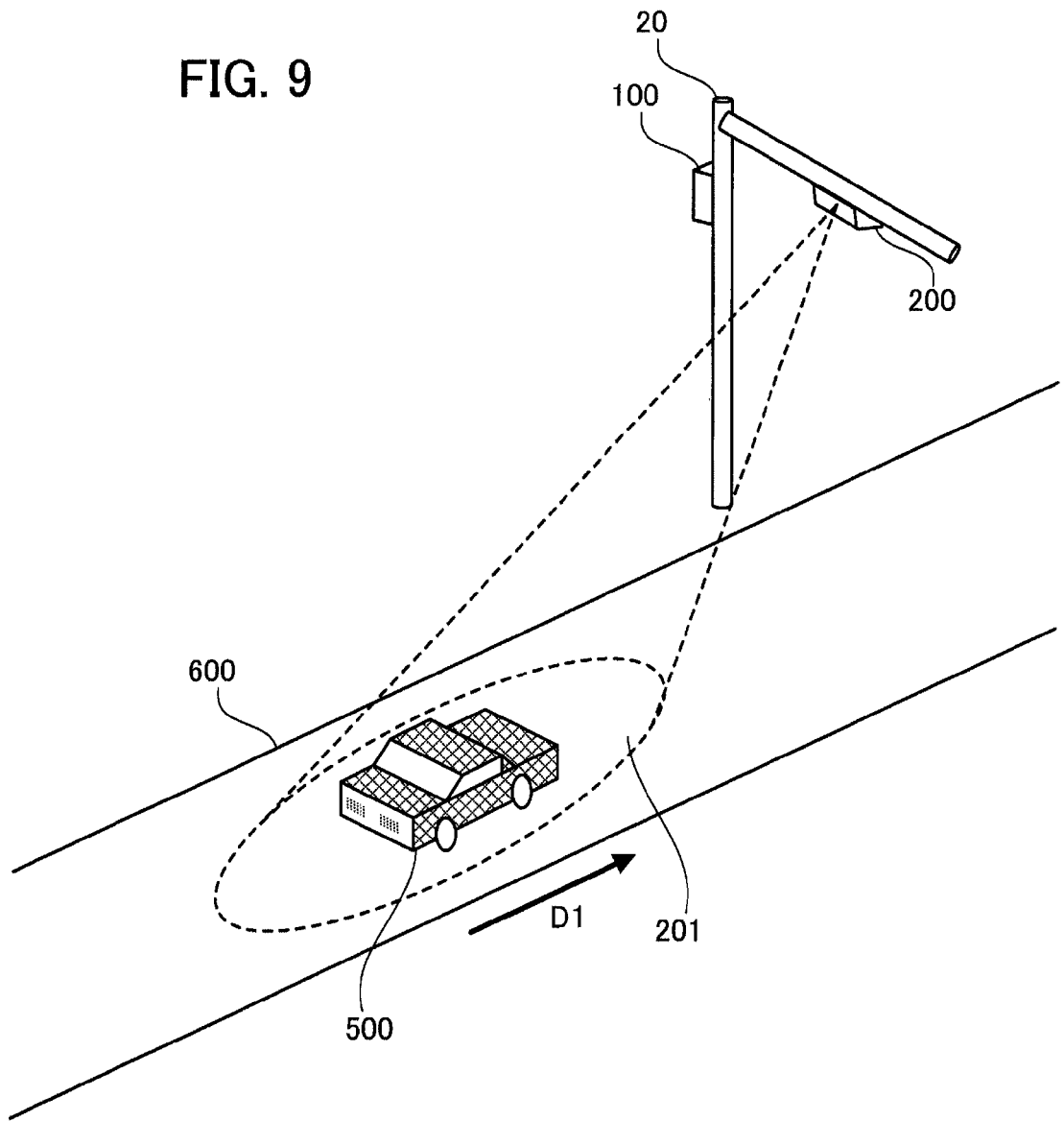
FIG. 9 illustrates vehicle detection by a radar in the second embodiment.

FIG. 9 illustrates how the radar 200 is mounted over the road which is an object of management. As illustrated in FIG. 9, the radar 200 is mounted on a support 20 set up beside a road 600, that is to say, at a high place so that a direction in which a beam 201 is emitted will be parallel to a direction in which the road 600 extends. The radar 200 irradiates a moving vehicle 500 on the road 600 with the beam 201 which is narrow beam radio waves, and receives radio waves reflected from the moving vehicle 500 by the receiving antenna. By doing so, the radar 200 detects the position and speed of the moving vehicle 500 which moves along the road 600 in a direction D1. A detection result regarding the moving vehicle 500 detected by the radar 200 is collected by the control apparatus 100 mounted, for example, on the support 20 and a collection result is transmitted to the monitoring apparatus 300.

It is assumed that a reference point (origin) for the position of the moving vehicle 500 detected by the radar 200 is right under a point at which the radar 200 is mounted. Furthermore, the radar 200 is mounted so that a vehicle which moves along a lane of the road 600 will be irradiated with the beam 201. By properly adjusting the dip and azimuth, optimum detection distance is obtained.

In this embodiment the case where a moving vehicle in one lane is detected is taken as an example. However, it is possible to detect moving vehicles in a plurality of lanes at the same time by the use of a plurality of radars mounted, for example, over the plurality of lanes.

In addition, the case where the radar 200 irradiates the moving vehicle 500 with the beam 201 from the front for detecting it is illustrated in FIG. 9 as an example. However, the radar 200 may irradiate the moving vehicle 500 with the beam 201 from the rear for detecting it.

Figure 10:
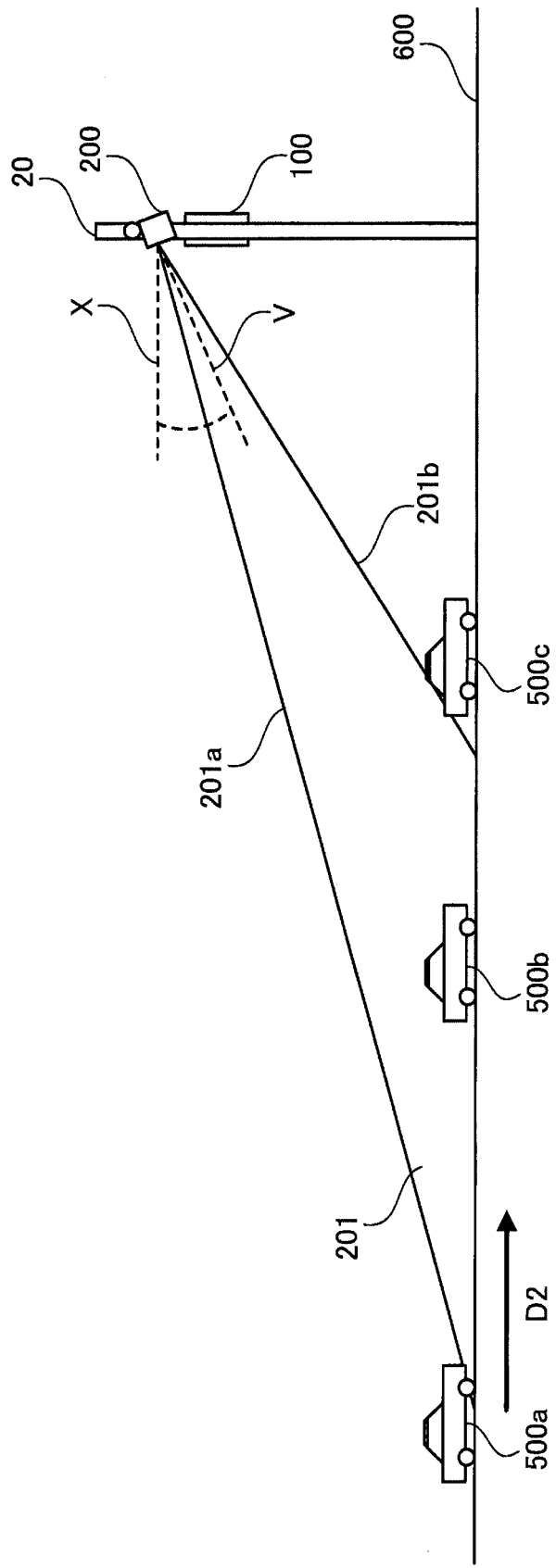
FIG. 10 illustrates vehicle detection by a radar in the second embodiment.

FIG. 10 illustrates how the radar 200 irradiates moving vehicles (500a, 500b, and 500c) with the beam 201. As illustrated in FIG. 10, it is assumed that moving vehicles 500a, 500b, and 500c move along the road 600, which is an object of management, in a direction D2. The radar 200 which, together with the control apparatus 100, is mounted on the support 20 irradiates the moving vehicles 500a through 500c with the beam 201.

At this time the radar 200 emits the beam 201 downward from the antenna at a determined angle V (6 degrees, for example) to a horizontal direction X. The radar 200 receives radio waves reflected by the receiving antenna. By doing so, the radar 200 detects the position and speed of each of the moving vehicles 500a through 500c which are in an area between boundary planes 201a and 201b of the beam 201.

Figure 11:
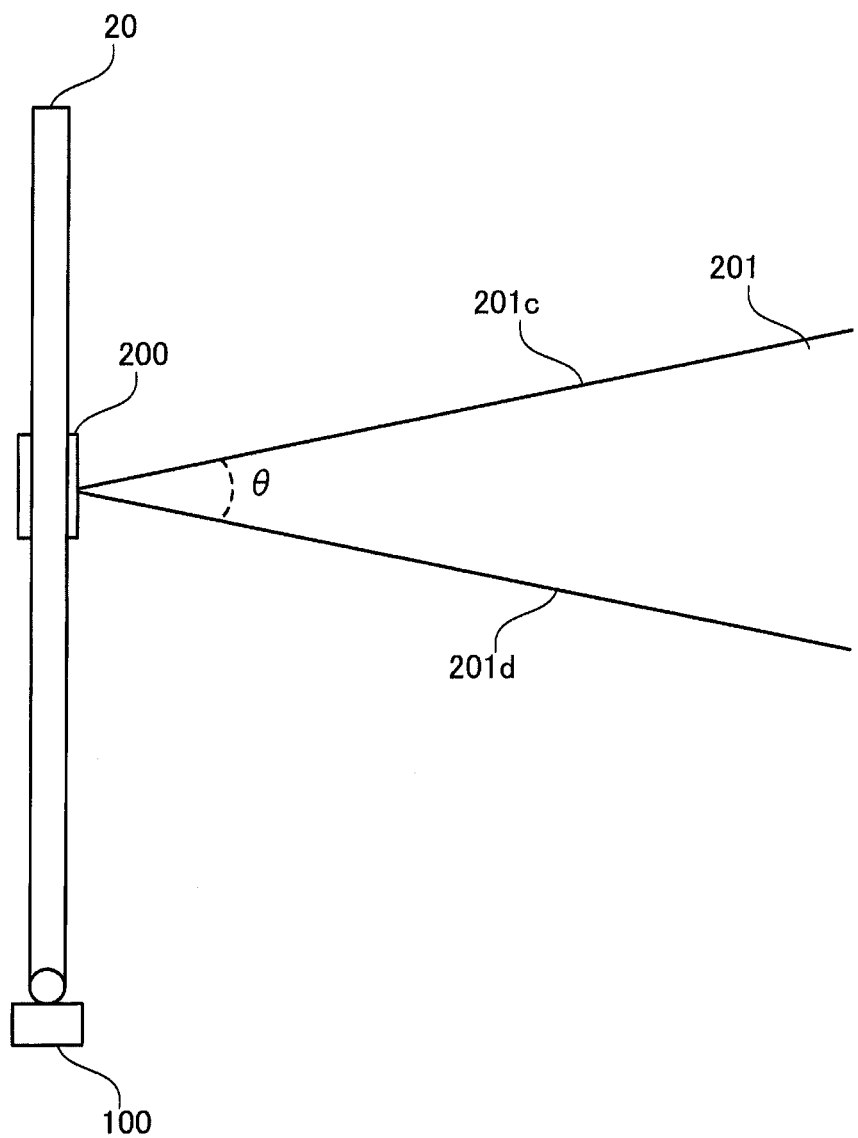
FIG. 11 illustrates vehicle detection by a radar in the second embodiment.

FIG. 11 illustrates the emission of the beam 201 from the radar 200 viewed from above. As illustrated in FIG. 11, the radar 200 which, together with the control apparatus 100, is mounted on the support 20 emits the beam 201 from the antenna so that an angle between boundary planes 201c and 201d of the beam 201 will become a determined angle θ (4 degrees, for example).

Figure 12:
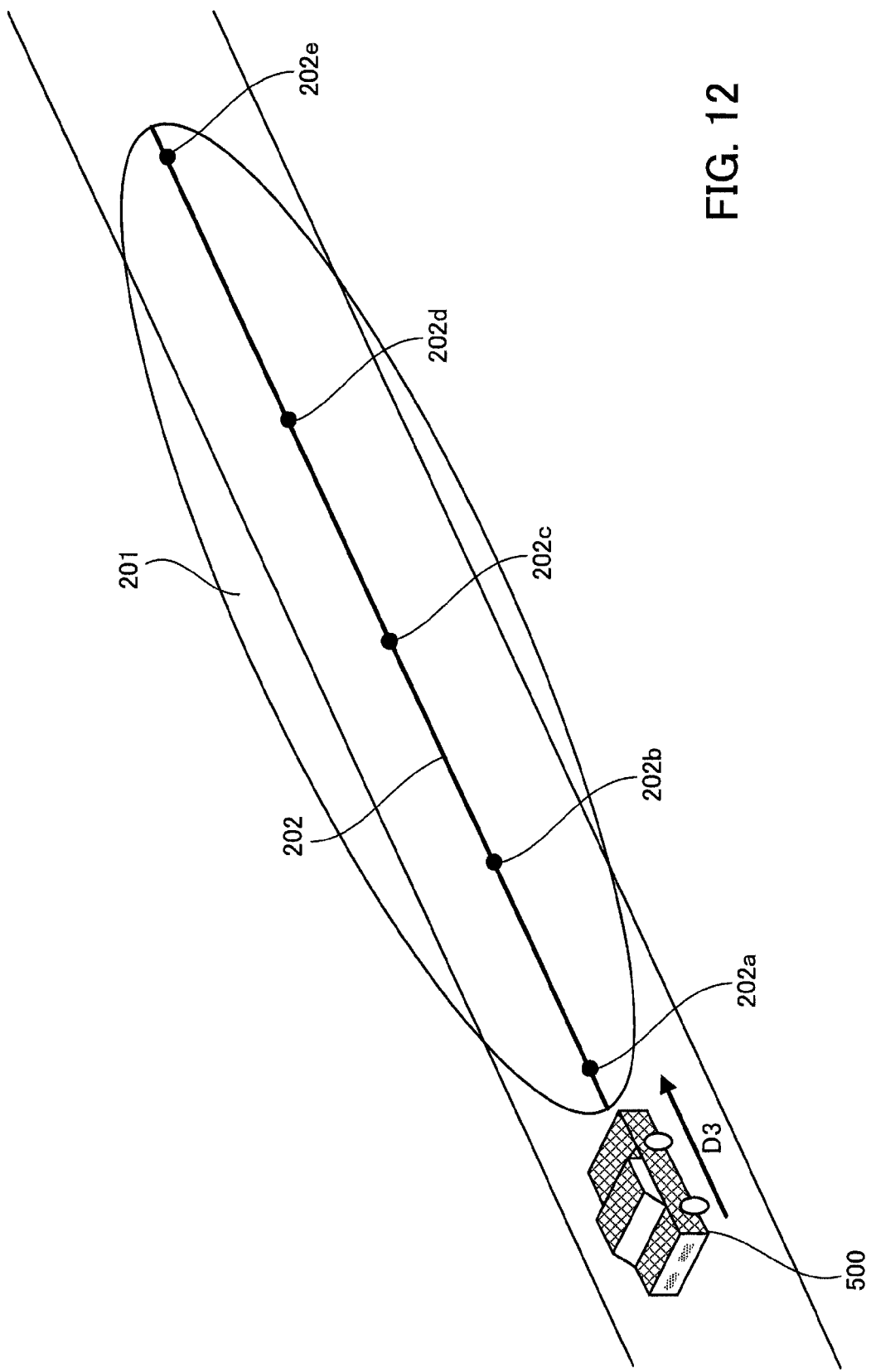
FIG. 12 illustrates vehicle detection by a radar in the second embodiment.

FIG. 12 illustrates an example of the case where the radar 200 detects the moving vehicle 500 from the front. It is assumed that the moving vehicle 500 which moves in a direction D3 enters a detection area in which detection is performed by the beam 201, that the moving vehicle 500 moves along a track 202, and that the moving vehicle 500 gets out of the detection area in which detection is performed by the beam 201. The radar 200 detects the moving vehicle 500 at determined time intervals (at intervals of 10 seconds, for example) and obtains detection results. As a result, the radar 200 detects the coordinates (202a, 202b, 202c, 202d, and 202e) and speeds of the moving vehicle 500 which passes through the detection area and the receiving power of radio waves reflected from the moving vehicle 500 at determined time intervals and transmits detection results to the control apparatus 100. As stated above, the control apparatus 100 which receives the detection results collects detection results regarding each moving vehicle. It is assumed that the coordinate 202a at which the moving vehicle 500 is detected first in the detection area is a detection start coordinate and that the coordinate 202e at which the moving vehicle 500 is detected last in the detection area is a detection end coordinate.

In this embodiment the radar 200 irradiates the moving vehicle 500 which approaches the radar 200 with the beam 201 from the front for detecting it. Alternatively, the radar 200 may irradiate the moving vehicle 500 which passes through a place right under the radar 200 and which recedes from the radar 200 with the beam 201 from the rear for detecting it.

Furthermore, in this embodiment the radar 200 detects the position of the moving vehicle 500 as a one-dimensional coordinate on a coordinate axis parallel to the direction of the beam 201 emitted from the antenna of the radar 200. However, the radar 200 may detect the position of the moving vehicle 500 as coordinates in a two-dimensional coordinate system or another coordinate system.

Figure 13:
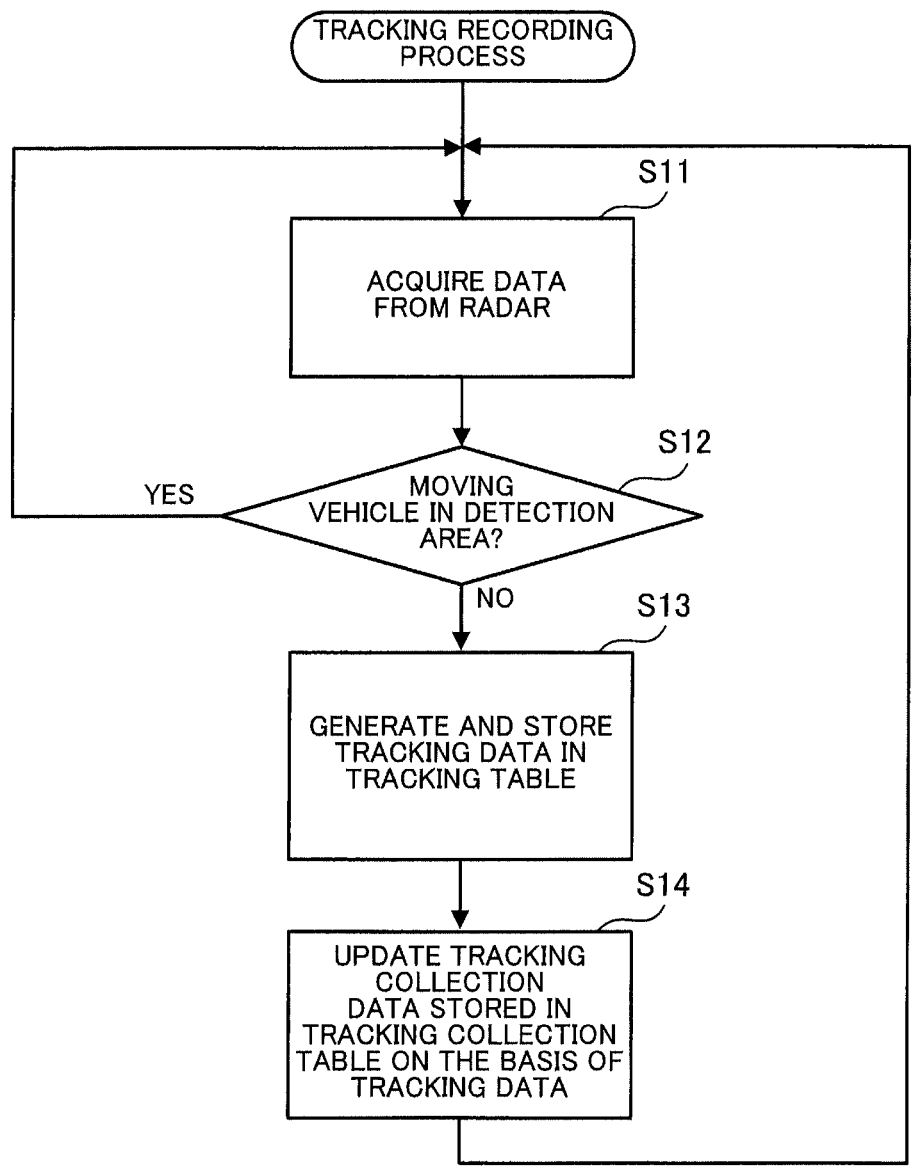
FIG. 13 is a flow chart of a procedure for a tracking recording process in the second embodiment.

FIG. 13 is a flow chart of a procedure for a tracking recording process in the second embodiment. The control apparatus 100 in this embodiment performs a tracking recording process. That is to say, the control apparatus 100 stores a detection result regarding the moving vehicle 500 detected by the radar 200 in the tracking table 151a stored in the tracking data storage unit 151 and updates tracking collection data stored in the tracking collection table 152a stored in the tracking collection data storage unit 152. The tracking recording process is continued while the radar 200 is operating. The tracking recording process indicated in FIG. 13 will now be described in order of step number.

(Step S11) The acquisition unit 110 acquires detection data regarding the moving vehicle 500 from the radar 200. If there are a plurality of moving vehicles in the detection area, then the acquisition unit 110 assigns ID to each moving vehicle and detects the plurality of moving vehicles separately.

(Step S12) The acquisition unit 110 determines whether or not the moving vehicle 500 is in the detection area. If the moving vehicle 500 is in the detection area, then step S11 is performed. On the other hand, if the moving vehicle 500 is not in the detection area, then step S13 is performed.

(Step S13) The acquisition unit 110 generates tracking data regarding the moving vehicle detected and stores the generated tracking data in the tracking table 151a stored in the tracking data storage unit 151. If a plurality of moving vehicles are detected at the same time, then the acquisition unit 110 generates tracking data regarding each moving vehicle and stores it in the tracking table 151a.

(Step S14) On the basis of the tracking data which is generated and stored by the acquisition unit 110 in the tracking table 151a stored in the tracking data storage unit 151 in step S13, the calculation unit 120 updates tracking collection data stored in the tracking collection table 152a stored in the tracking collection data storage unit 152. To be concrete, the calculation unit 120 adds the number of moving vehicles newly detected (that is to say, the number of pieces of tracking data newly generated) to a moving vehicle number included in tracking collection data, and adds the values of a detection start coordinate, a detection end coordinate, and receiving power included in each piece of tracking data newly generated to the values of a total detection start coordinate, a total detection end coordinate, and total receiving power, respectively, included in the tracking collection data. After that, step S11 is performed.

Figure 14:
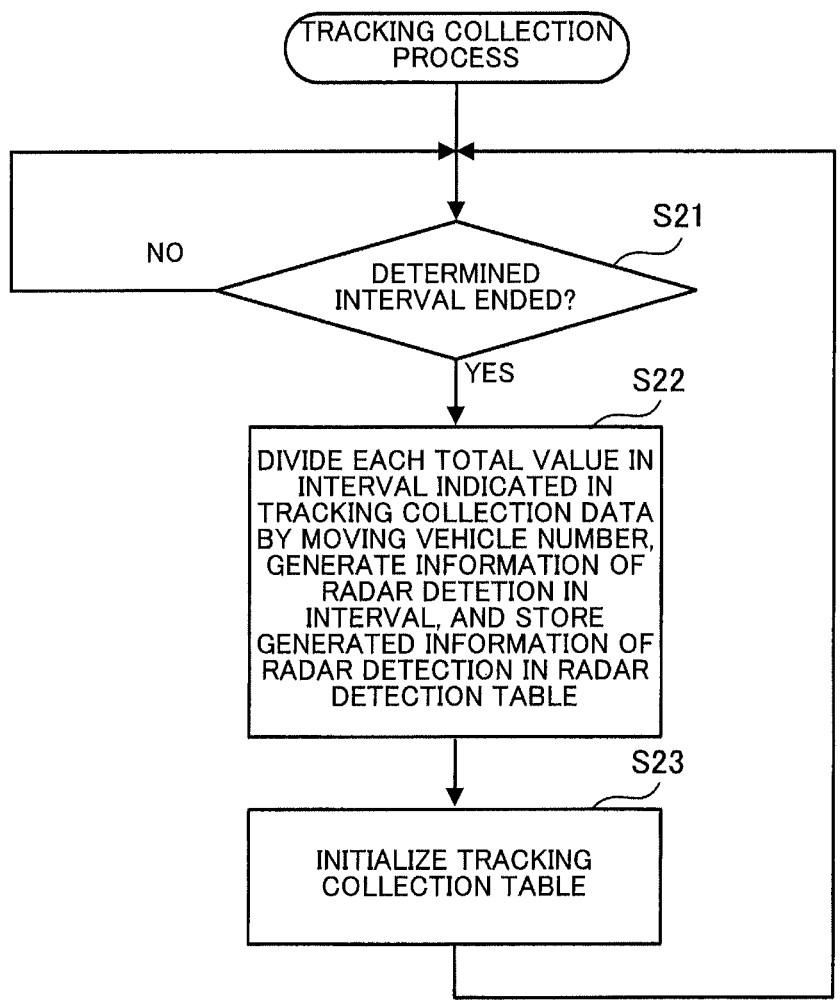
FIG. 14 is a flow chart of a procedure for a tracking collection process in the second embodiment.

FIG. 14 is a flow chart of a procedure for a tracking collection process in the second embodiment. The control apparatus 100 in this embodiment performs a tracking collection process. That is to say, the control apparatus 100 generates information of radar detection in an interval by dividing each total value included in tracking collection data stored by a tracking recording process in the tracking collection table 152a by a moving vehicle number in the interval, and stores the generated information of radar detection in the radar detection table 153a stored in the radar detection storage unit 153. The tracking collection process is continued while the radar 200 is operating. The tracking collection process indicated in FIG. 14 will now be described in order of step number.

(Step S21) The calculation unit 120 determines whether or not a determined interval for tracking the moving vehicle 500 has ended. If the determined interval has ended, then step S22 is performed. On the other hand, if the determined interval has not ended, then step S21 is repeated. The determined interval may be a certain period of time (10 minutes, for example). Alternatively, it is determined the determined interval ends when a certain number of (100, for example) moving vehicles are detected.

(Step S22) On the basis of tracking collection data in the interval the ending of which is determined in step S21, the calculation unit 120 divides each total value (total detection start coordinate, a total detection end coordinate, and total receiving power) in the interval by a moving vehicle number in the interval, generates information of radar detection indicative of a result obtained, and stores the generated information of radar detection in the radar detection table 153a stored in the radar detection storage unit 153.

(Step S23) The calculation unit 120 initializes the tracking collection table 152a stored in the tracking collection data storage unit 152. After that, step S21 is performed.

Figure 15:
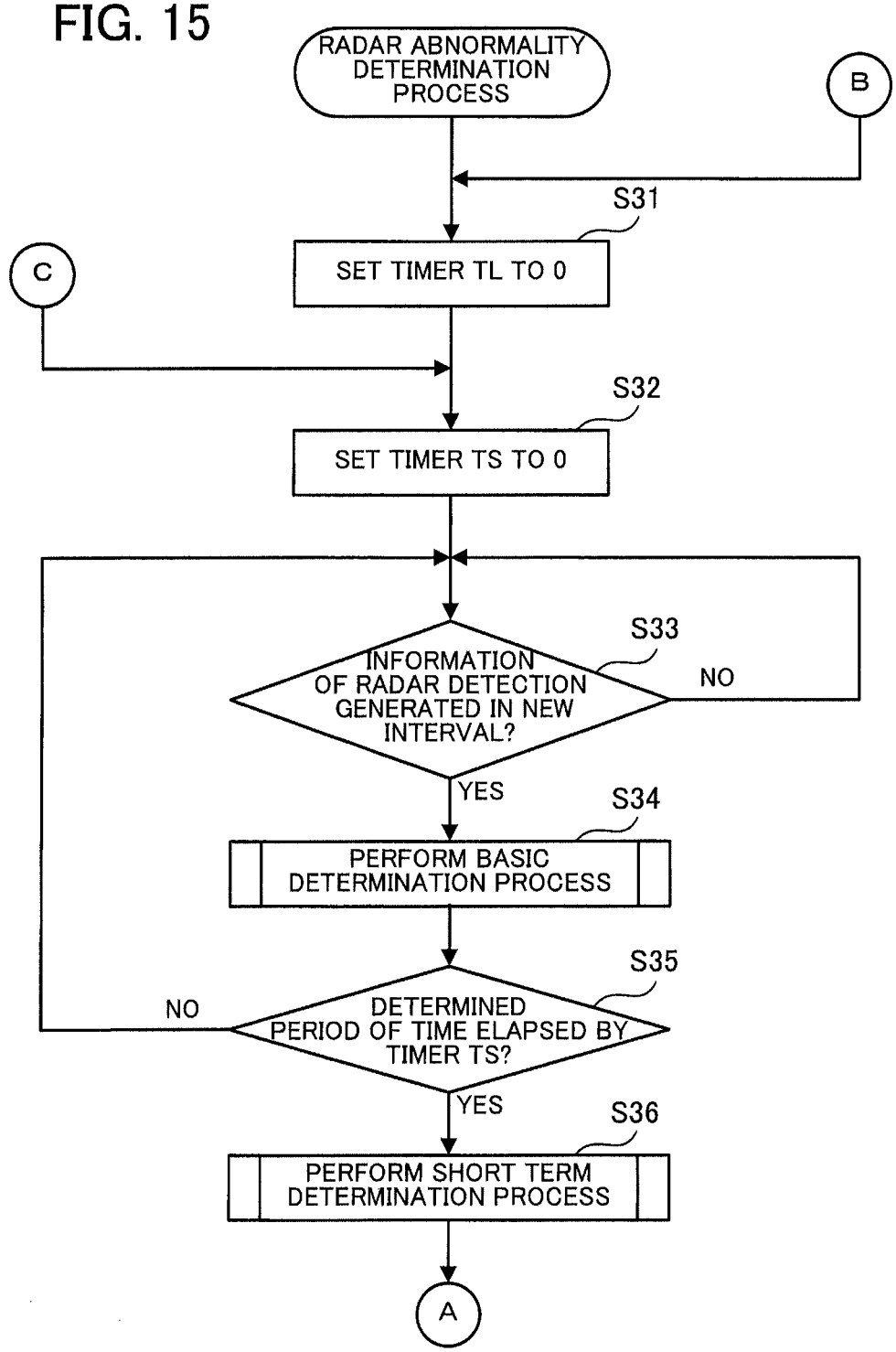
FIG. 15 is a flow chart of a procedure for a radar abnormality determination process in the second embodiment (part 1)
Figure 16:
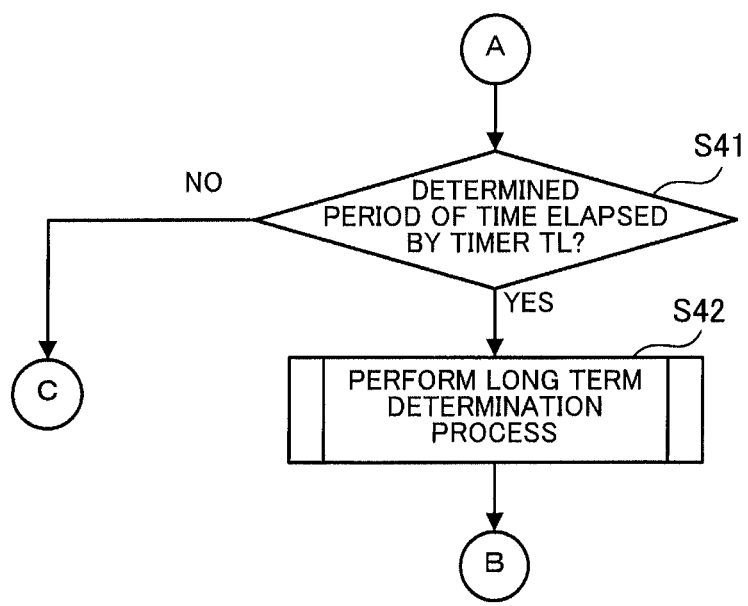
FIG. 16 is a flow chart of the procedure for the radar abnormality determination process in the second embodiment (part 2)

FIGS. 15 and 16 are flow charts of a procedure for a radar abnormality determination process in the second embodiment. The control apparatus 100 in this embodiment performs a radar abnormality determination process. That is to say, on the basis of a detection result regarding the moving vehicle 500, the control apparatus 100 determines whether or not an abnormality, such as a variation of an antenna direction or adhesion of dirt to the radome, has occurred in the radar 200. The radar abnormality determination process is continued while the radar 200 is operating. The radar abnormality determination process indicated in FIGS. 15 and 16 will now be described in order of step number.

(Step S31) The comparison unit 130 initializes a timer TL used for determining whether to perform a long term determination process described later (set the timer TL to 0).

(Step S32) The comparison unit 130 initializes a timer TS used for determining whether to perform a short term determination process described later (set the timer TS to 0).

(Step S33) The comparison unit 130 determines whether or not information of radar detection described above in step S22 is generated in a new interval by the calculation unit 120. If information of radar detection is generated in a new interval, then step S34 is performed. On the other hand, if information of radar detection is not generated in a new interval, then step S33 is repeated. As a result, a basic determination process described later is performed on the basis of the information of radar detection newly generated after the ending of the determined interval.

(Step S34) The comparison unit 130 performs a basic determination process. That is to say, the comparison unit 130 compares each average value with a threshold on the basis of the information of radar detection and evaluates whether or not there is an abnormality in the radar 200. The details of the basic determination process will be described later in FIGS. 17 and 18.

(Step S35) The comparison unit 130 determines whether or not a determined period of time (one month, for example) has elapsed by the timer TS. If the determined period of time has elapsed by the timer TS, then step S36 is performed. On the other hand, if the determined period of time has not elapsed by the timer TS, then step S33 is performed.

(Step S36) The abnormality determination unit 140 performs the short term determination process. That is to say, on the basis of the result of the evaluation by the basic determination process, the abnormality determination unit 140 determines whether or not an abnormality has occurred in the radar 200 in the short term. The details of the short term determination process will be described later in FIG. 19. After that, step S41 (FIG. 16) is performed.

(Step S41) The comparison unit 130 determines whether or not a determined period of time (six months, for example) has elapsed by the timer TL. If the determined period of time has elapsed by the timer TL, then step S42 is performed. On the other hand, if the determined period of time has not elapsed by the timer TL, then step S32 is performed.

(Step S42) The abnormality determination unit 140 performs the long term determination process. That is to say, on the basis of the result of the determination by the short term determination process, the abnormality determination unit 140 finally determines whether or not an abnormality has occurred in the radar 200 in the long term. The details of the long term determination process will be described later in FIG. 20. After that, step S31 is performed.

Figure 17:
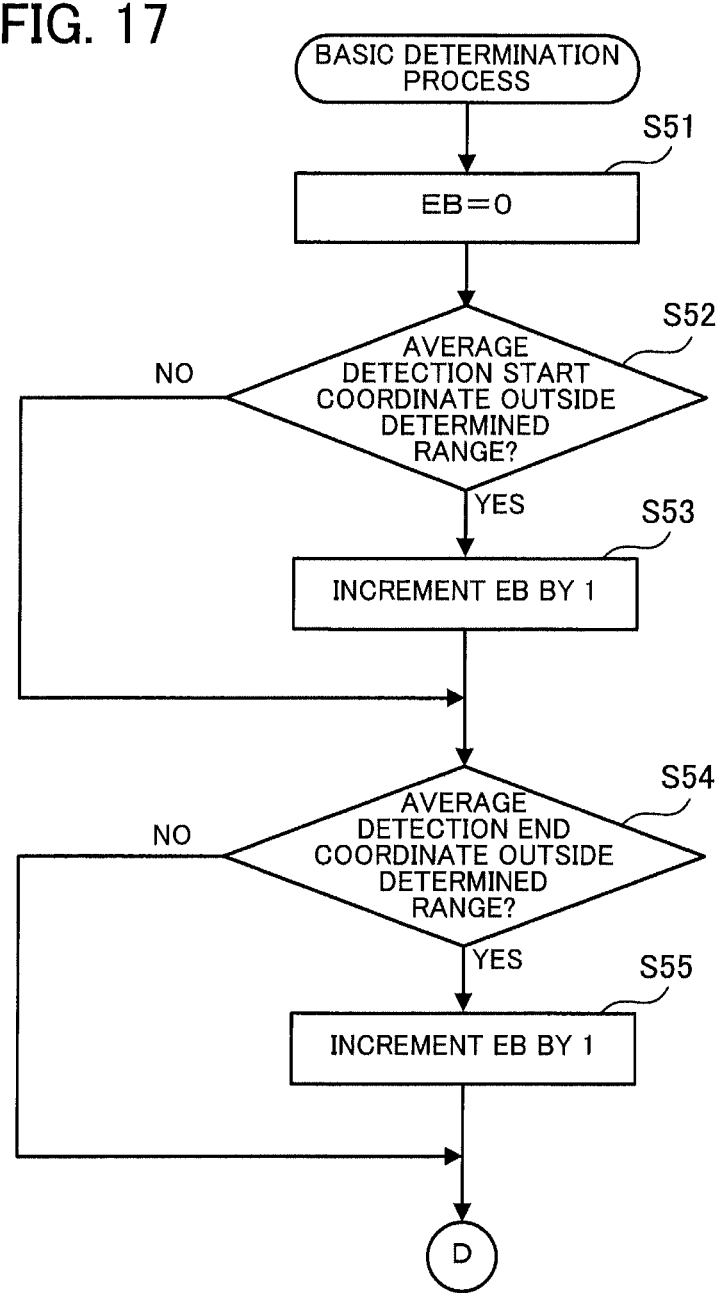
FIG. 17 is a flow chart of a procedure for a basic determination process in the second embodiment (part 1)
Figure 18:
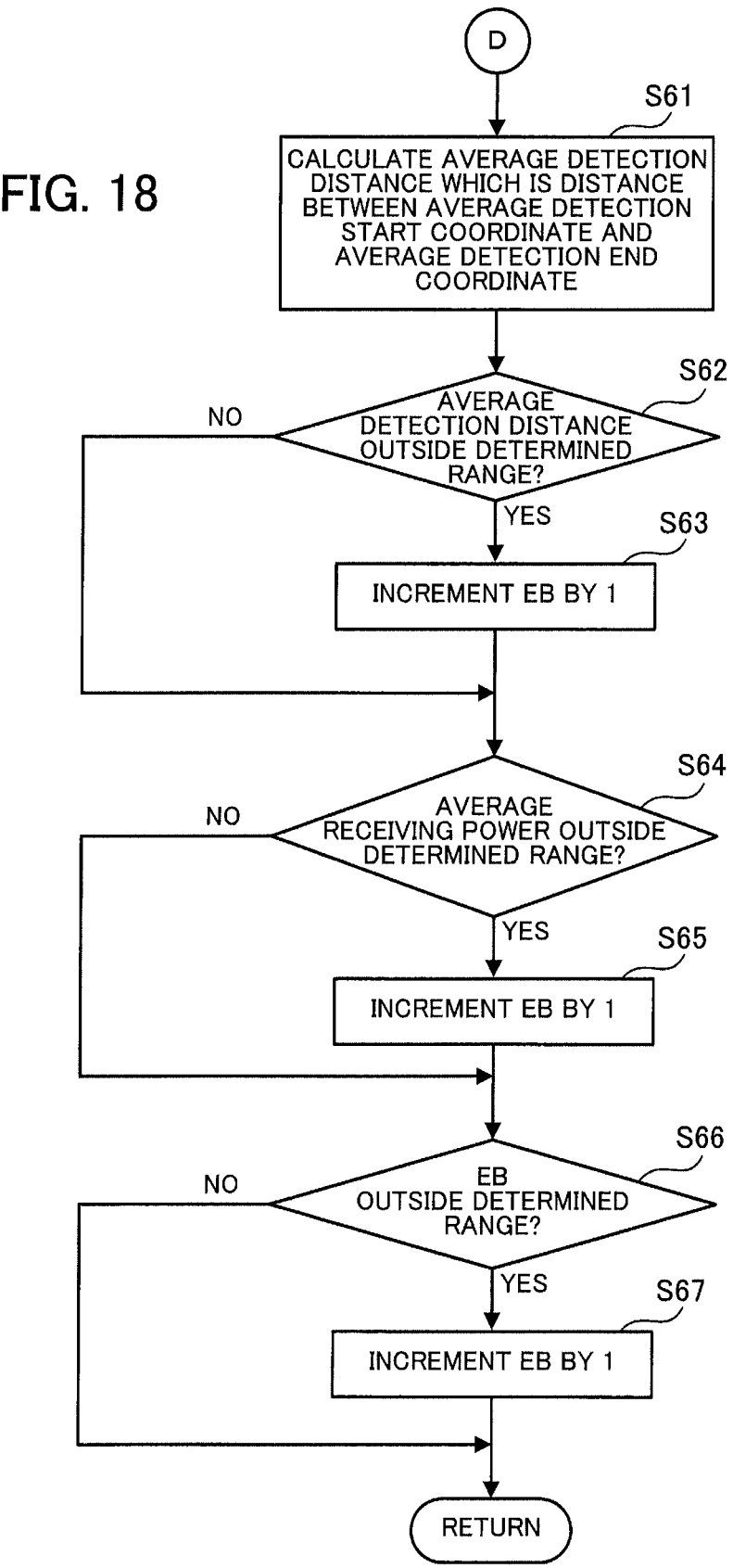
FIG. 18 is a flow chart of the procedure for the basic determination process in the second embodiment (part 2)

FIGS. 17 and 18 are flow charts of a procedure for the basic determination process in the second embodiment. The control apparatus 100 in this embodiment performs the basic determination process. That is to say, the control apparatus 100 compares, on the basis of information of radar detection, each average value included in the information of radar detection with a threshold and evaluates whether or not there is an abnormality in the radar 200. The basic determination process is continued while the radar 200 is operating. The basic determination process indicated in FIGS. 17 and 18 will now be described in order of step number.

(Step S51) The comparison unit 130 initializes a variable EB (sets the variable EB to 0). Each average value included in information of radar detection is compared with a threshold. If each average value is outside a determined range, then the variable EB is incremented.

(Step S52) The comparison unit 130 determines whether or not an average detection start coordinate which indicates the average value of detection start coordinates and which is included in the information of radar detection is outside a determined range. If the average detection start coordinate is outside the determined range, then step S53 is performed. On the other hand, if the average detection start coordinate is within the determined range, then step S54 is performed. Whether the average detection start coordinate is outside the determined range is determined by comparing the average detection start coordinate with a detection start coordinate threshold which is a reference value set in advance.

It is assumed that a point right under the antennas of the radar 200 is an origin (0) and that the value of a coordinate indicative of the position of the moving vehicle 500 which is a detection result increases with an increase in the distance from the radar 200.

For example, it is assumed that the radar 200 detects the moving vehicle 500 by irradiating the moving vehicle 500 with the beam 201 from the front (radar 200 detects the moving vehicle 500 which is approaching the radar 200). If the average detection start coordinate is greater than or equal to the detection start coordinate threshold (average detection start coordinate detection start coordinate threshold), then the comparison unit 130 determines that the average detection start coordinate is outside the determined range. On the other hand, if the average detection start coordinate is smaller than the detection start coordinate threshold (average detection start coordinate<detection start coordinate threshold), then the comparison unit 130 determines that the average detection start coordinate is within the determined range.

In addition, it is assumed that the radar 200 detects the moving vehicle 500 by irradiating the moving vehicle 500 with the beam 201 from the rear (radar 200 detects the moving vehicle 500 which is receding from the radar 200). If the average detection start coordinate is smaller than or equal to the detection start coordinate threshold (average detection start coordinate≤detection start coordinate threshold), then the comparison unit 130 determines that the average detection start coordinate is outside the determined range. On the other hand, if the average detection start coordinate is greater than the detection start coordinate threshold (average detection start coordinate>detection start coordinate threshold), then the comparison unit 130 determines that the average detection start coordinate is within the determined range.

(Step S53) The comparison unit 130 determines in step S52 that the average detection start coordinate is outside the determined range. Accordingly, the comparison unit 130 increments the variable EB by 1.

(Step S54) The comparison unit 130 determines whether or not an average detection end coordinate which indicates the average value of detection end coordinates and which is included in the information of radar detection is outside a determined range. If the average detection end coordinate is outside the determined range, then step S55 is performed. On the other hand, if the average detection end coordinate is within the determined range, then step S61 (FIG. 18) is performed. Whether the average detection end coordinate is outside the determined range is determined by comparing the average detection end coordinate with a detection end coordinate threshold which is a reference value set in advance.

For example, it is assumed that the radar 200 detects the moving vehicle 500 by irradiating the moving vehicle 500 with the beam 201 from the front. If the average detection end coordinate is smaller than or equal to the detection end coordinate threshold (average detection end coordinate≤detection end coordinate threshold), then the comparison unit 130 determines that the average detection end coordinate is outside the determined range. On the other hand, if the average detection end coordinate is greater than the detection end coordinate threshold (average detection end coordinate>detection end coordinate threshold), then the comparison unit 130 determines that the average detection end coordinate is within the determined range.

In addition, it is assumed that the radar 200 detects the moving vehicle 500 by irradiating the moving vehicle 500 with the beam 201 from the rear. If the average detection end coordinate is greater than or equal to the detection end coordinate threshold (average detection end coordinate≥detection end coordinate threshold), then the comparison unit 130 determines that the average detection end coordinate is outside the determined range. On the other hand, if the average detection end coordinate is smaller than the detection end coordinate threshold (average detection end coordinate<detection end coordinate threshold), then the comparison unit 130 determines that the average detection end coordinate is within the determined range.

(Step S55) The comparison unit 130 determines in step S54 that the average detection end coordinate is outside the determined range. Accordingly, the comparison unit 130 increments the variable EB by 1. After that, step S61 is performed.

(Step S61) The comparison unit 130 calculates a distance (hereinafter referred to as the average range of vehicle detection distance) between the average detection start coordinate and the average detection end coordinate. To be concrete, the comparison unit 130 calculates |(average detection start coordinate)−(average detection end coordinate)| (absolute value of the difference between the average detection start coordinate and the average detection end coordinate) and treats the calculated distance as an average range of vehicle detection distance.

(Step S62) The comparison unit 130 determines whether or not the average range of vehicle detection distance calculated in step S61 is outside a determined range. If the average range of vehicle detection distance is outside the determined range, then step S63 is performed. On the other hand, if the average range of vehicle detection distance is within the determined range, then step S64 is performed. Whether the average range of vehicle detection distance is outside the determined range is determined by comparing the average range of vehicle detection distance with a detection distance threshold which is a reference value set in advance.

For example, if the average range of vehicle detection distance is greater than or equal to the detection distance threshold (average range of vehicle detection distance≥detection distance threshold), then the comparison unit 130 determines that the average range of vehicle detection distance is outside the determined range. On the other hand, if the average range of vehicle detection distance is smaller than the detection distance threshold (average range of vehicle detection distance<detection distance threshold), then the comparison unit 130 determines that the average range of vehicle detection distance is within the determined range. This applies to both of the case where the radar 200 detects the moving vehicle 500 by irradiating the moving vehicle 500 with the beam 201 from the front and the case where the radar 200 detects the moving vehicle 500 by irradiating the moving vehicle 500 with the beam 201 from the rear.

(Step S63) The comparison unit 130 determines in step S62 that the average range of vehicle detection distance is outside the determined range. Accordingly, the comparison unit 130 increments the variable EB by 1.

(Step S64) The comparison unit 130 determines whether or not average receiving power which indicates the average value of receiving power and which is included in the information of radar detection is outside a determined range. If the average receiving power is outside the determined range, then step S65 is performed. On the other hand, if the average receiving power is within the determined range, then step S66 is performed. Whether the average receiving power is outside the determined range is determined by comparing the average receiving power with a receiving power threshold which is a reference value set in advance.

For example, if the average receiving power is greater than or equal to the receiving power threshold (average receiving power≥receiving power threshold), then the comparison unit 130 determines that the average receiving power is outside the determined range. On the other hand, if the average receiving power is smaller than the receiving power threshold (average receiving power<receiving power threshold), then the comparison unit 130 determines that the average receiving power is within the determined range. This applies to both of the case where the radar 200 detects the moving vehicle 500 by irradiating the moving vehicle 500 with the beam 201 from the front and the case where the radar 200 detects the moving vehicle 500 by irradiating the moving vehicle 500 with the beam 201 from the rear.

(Step S65) The comparison unit 130 determines in step S64 that the average receiving power is outside the determined range. Accordingly, the comparison unit 130 increments the variable EB by 1.

(Step S66) The comparison unit 130 determines whether or not the variable EB having a value based on the determination results in steps S52, S54, S62, and S64 is outside a determined range. If the variable EB is outside the determined range, then step S67 is performed. On the other hand, if the variable EB is within the determined range, then the radar abnormality determination process is performed. Whether the variable EB is outside the determined range is determined by comparing the variable EB with an EB threshold which is a reference value set in advance.

For example, if the variable EB is greater than or equal to the EB threshold (variable EB≥EB threshold), then the comparison unit 130 determines that the variable EB is outside the determined range. On the other hand, if the variable EB is smaller than the EB threshold (variable EB<EB threshold), then the comparison unit 130 determines that the variable EB is within the determined range. This applies to both of the case where the radar 200 detects the moving vehicle 500 by irradiating the moving vehicle 500 with the beam 201 from the front and the case where the radar 200 detects the moving vehicle 500 by irradiating the moving vehicle 500 with the beam 201 from the rear.

(Step S67) The comparison unit 130 determines in step S66 that the variable EB is outside the determined range. If the variable EB is compared with the EB threshold and the variable EB is outside the determined range, then a variable ES is incremented. Accordingly, the comparison unit 130 increments the variable ES by 1. After that, the radar abnormality determination process is performed.

With the basic determination process in this embodiment whether the average detection start coordinate is outside the determined range is determined in step S52. Whether the average detection end coordinate is outside the determined range is then determined in step S54. Whether the average range of vehicle detection distance is outside the determined range is then determined in step S62. Whether the average receiving power is outside the determined range is then determined in step S64. However, these determinations may be made in any order. In addition, a determination other than these determinations may be made in the basic determination process. Furthermore, one or more of these determinations may be omitted.

Figure 19:
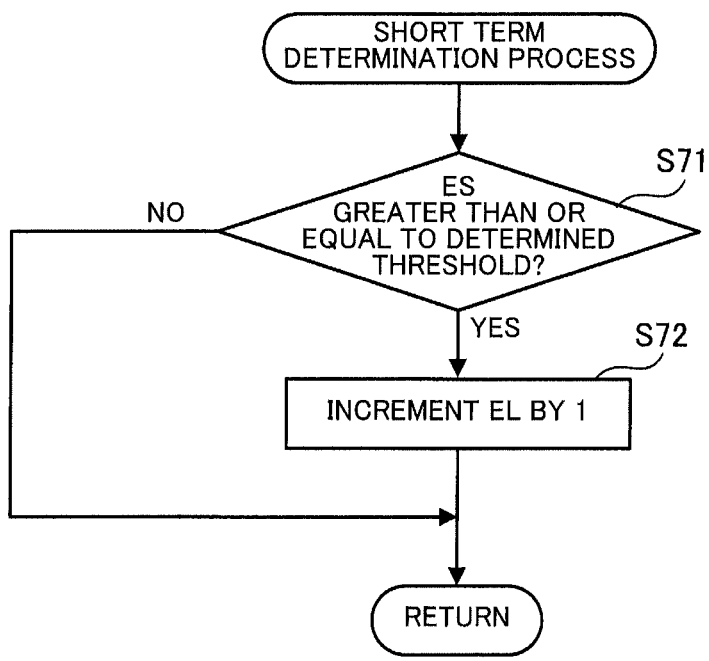
FIG. 19 is a flow chart of a procedure for a short term determination process in the second embodiment.

FIG. 19 is a flow chart of a procedure for the short term determination process in the second embodiment. The control apparatus 100 in this embodiment performs the short term determination process. That is to say, the control apparatus 100 compares the variable ES the value of which is set by the basic determination process with a threshold and determines whether or not an abnormality has occurred in the radar 200 in a short term. The short term determination process is continued while the radar 200 is operating. The short term determination process indicated in FIG. 19 will now be described in order of step number.

(Step S71) The abnormality determination unit 140 compares the variable ES the value of which is set by the basic determination process with an ES threshold which is a determined threshold set in advance, and determines whether or not the variable ES is greater than or equal to the ES threshold. If the variable ES is greater than or equal to the ES threshold, then step S72 is performed. On the other hand, if the variable ES is smaller than the ES threshold, then the radar abnormality determination process is performed.

(Step S72) The abnormality determination unit 140 determines in step S71 that the variable ES is greater than or equal to the ES threshold. If the variable ES is compared with the ES threshold and the variable ES is outside a determined range, then a variable EL is incremented. Accordingly, the abnormality determination unit 140 increments the variable EL by 1. After that, the radar abnormality determination process is performed.

Figure 20:
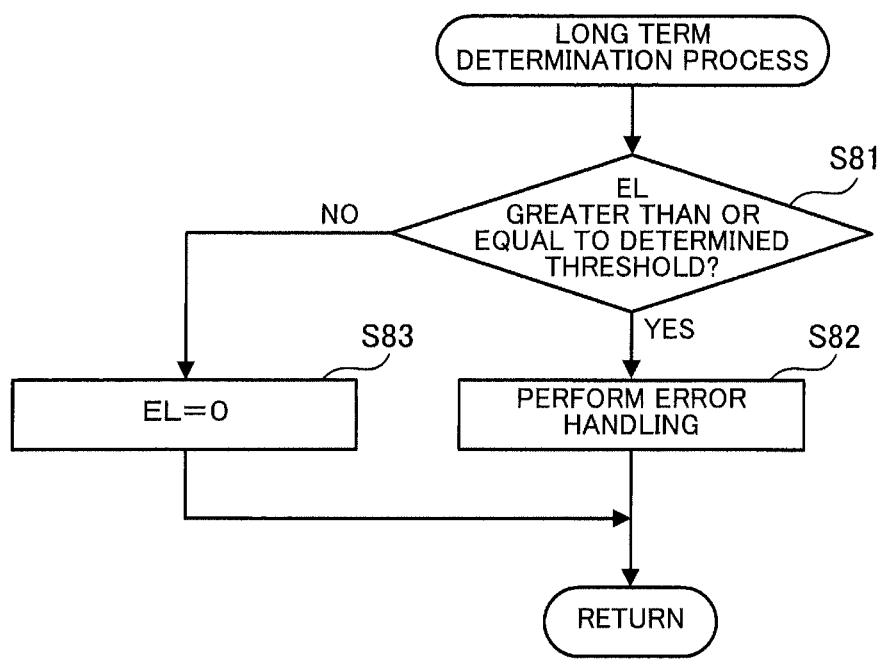
FIG. 20 is a flow chart of a procedure for a long term determination process in the second embodiment.

FIG. 20 is a flow chart of a procedure for the long term determination process in the second embodiment. The control apparatus 100 in this embodiment performs the long term determination process. That is to say, the control apparatus 100 compares the variable EL the value of which is set by the short term determination process with a threshold and finally determines whether or not an abnormality has occurred in the radar 200 in a long term. The long term determination process is continued while the radar 200 is operating. The long term determination process indicated in FIG. 20 will now be described in order of step number.

(Step S81) The abnormality determination unit 140 compares the variable EL the value of which is set by the short term determination process with an EL threshold which is a determined threshold set in advance, and determines whether or not the variable EL is greater than or equal to the EL threshold. If the variable EL is greater than or equal to the EL threshold, then step S82 is performed. On the other hand, if the variable EL is smaller than the EL threshold, then step S83 is performed.

(Step S82) The abnormality determination unit 140 determines in step S81 that the variable EL is greater than or equal to the EL threshold. Accordingly, the abnormality determination unit 140 performs error handling. When the abnormality determination unit 140 performs error handling, the abnormality determination unit 140 informs the monitoring apparatus 300 and other upper apparatus of the occurrence of an abnormality in the radar 200, records an error log indicative of the occurrence of the abnormality in the radar 200, stops detection by the radar 200, shifts to degraded function mode in which the detection of an item for which the abnormality has occurred in the radar 200 is stopped, or the like. After that, the radar abnormality determination process is performed.

(Step S83) The abnormality determination unit 140 determines in step S81 that the variable EL is smaller than the EL threshold. Accordingly, the abnormality determination unit 140 initializes the variable EL (sets the variable EL to 0). After that, the radar abnormality determination process is performed.

As has been described, the control apparatus 100 in the second embodiment monitors an abnormality in the radar 200 by a detection result regarding an object of detection outputted from the radar 200, and detects a deterioration in the performance of the radar 200.

Furthermore, the average value of detection starting positions and the average value of detection ending positions are calculated each time the determined number of vehicles are detected or the determined period of time elapses. An error is detected on the basis of the calculated average values, thereby making it possible to detect a deterioration in the performance of the radar 200.

In addition, radio waves emitted from the antenna of the radar 200 are reflected from the moving vehicle 500, the average value of receiving power of reflected radio waves is calculated, and an error is detected on the basis of the calculated average value, thereby making it possible to detect a deterioration in the performance of the radar 200.

Moreover, an error is detected on the basis of average range of vehicle detection distance which is the distance between an average detection starting position and an average detection ending position, thereby making it possible to detect a deterioration in the performance of the radar 200.

Furthermore, a secular change in the state of the radar 200 is detected by setting standards for determining a detection starting position and a detection ending position on the basis of a detection starting position and a detection ending position calculated in the past, thereby making it possible to detect a deterioration in the performance of the radar 200.

In addition, these comparison results make it possible to detect whether there is a variation of angle of the radar 200 or whether there is a dirt.

According to the disclosed control apparatus, radar detection system, and radar detection method, it is possible to monitor an abnormality in a radar by a detection result regarding an object of detection outputted from the radar, and to detect a deterioration in the performance of the radar.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A control apparatus comprising:
   a radar detection storage unit which stores information of radar detection;
   an acquisition unit which acquires coordinates of a detection starting position and coordinates of a detection ending position detected by a radar, for each of a plurality of moving vehicles moving in a moving direction on a road, the radar provided so as to have a detection area in the moving direction on the road;
   a calculation unit which calculates an average value of the coordinates of the detection starting positions acquired by the acquisition unit and an average value of the coordinates of the detection ending positions acquired by the acquisition unit and which stores the information of radar detection including the calculated average values in the radar detection storage unit;
   a comparison unit which compares the average value of the coordinates of the detection starting positions indicated by the information of radar detection stored in the radar detection storage unit with a determined reference value for the detection starting positions and which compares the average value of the coordinates of the detection ending positions indicated by the information of radar detection stored in the radar detection storage unit with a determined reference value for the detection ending positions; and
   an abnormality determination unit which determines on the basis of results of the comparisons by the comparison unit whether or not an abnormality has occurred in the radar.

2. The control apparatus according to claim 1, wherein each time a determined number of moving vehicles are detected, the calculation unit calculates the average value of the coordinates of the detection starting positions acquired by the acquisition unit and the average value of the coordinates of the detection ending positions acquired by the acquisition unit, and stores the information of radar detection including the calculated average values in the radar detection storage unit.

3. The control apparatus according to claim 1, wherein each time a determined period of time elapses, the calculation unit calculates the average value of the coordinates of the detection starting positions acquired by the acquisition unit and the average value of the coordinates of the detection ending positions acquired by the acquisition unit, and stores the information of radar detection including the calculated average values in the radar detection storage unit.

4. The control apparatus according to claim 1, wherein:
   the acquisition unit acquires, for each of the plurality of moving vehicles moving in the moving direction on the road, the coordinates of the detection starting position and the coordinates of the detection ending position detected by the radar and receiving power of radio waves reflected from said each of the plurality of moving vehicles;
   the calculation unit calculates the average value of the coordinates of the detection starting positions acquired by the acquisition unit, the average value of the coordinates of the detection ending positions acquired by the acquisition unit, and an average value of the receiving power acquired by the acquisition unit, and stores the information of radar detection including the calculated average values in the radar detection storage unit; and
   the comparison unit compares the average value of the coordinates of the detection starting positions indicated by the information of radar detection stored in the radar detection storage unit with the determined reference value for the detection starting positions, compares the average value of the coordinates of the detection ending positions indicated by the information of radar detection stored in the radar detection storage unit with the determined reference value for the detection ending positions, and compares the average value of the receiving power indicated by the information of radar detection stored in the radar detection storage unit with a determined reference value for the receiving power.

5. The control apparatus according to claim 1, wherein the comparison unit calculates an average range of vehicle detection distance which is an absolute value of a difference between the average value of the coordinates of the detection starting positions and the average value of the coordinates of the detection ending positions indicated by the information of radar detection stored in the radar detection storage unit, compares the average value of the coordinates of the detection starting positions indicated by the information of radar detection stored in the radar detection storage unit with the determined reference value for the detection starting positions, compares the average value of the coordinates of the detection ending positions indicated by the information of radar detection stored in the radar detection storage unit with the determined reference value for the detection ending positions, and compares the calculated average range of vehicle detection distance with a determined reference value for the average range of vehicle detection distance.

6. The control apparatus according to claim 1, wherein:
   the determined reference value for the detection starting positions is based on a detection starting position set at the time of mounting the radar; and
   the determined reference value for the detection ending positions is based on a detection ending position set at the time of mounting the radar.

7. The control apparatus according to claim 1, wherein:
the determined reference value for the detection starting positions is based on an average value of detection starting positions calculated in the past by the calculation unit; and
the determined reference value for the detection ending positions is based on an average value of detection ending positions calculated in the past by the calculation unit.

8. The control apparatus according to claim 1, wherein the abnormality determination unit:
determines on the basis of the results of the comparisons by the comparison unit whether or not a variation of angle of the radar has occurred; and
outputs, in the case of determining that a variation of angle of the radar has occurred, information which indicates that the variation of angle of the radar has occurred.

9. The control apparatus according to claim 1, wherein the abnormality determination unit:
determines on the basis of the results of the comparisons by the comparison unit whether or not there is dirt on a radome of the radar; and
outputs, in the case of determining that there is dirt on the radome of the radar, information which indicates that there is dirt on the radome of the radar.

10. A radar detection system comprising:
a radar which has a detection area in a moving direction on a road;
a control apparatus including:
a radar detection storage unit which stores information of radar detection;
an acquisition unit which acquires coordinates of a detection starting position and coordinates of a detection ending position detected by the radar, for each of a plurality of moving vehicles moving in the moving direction of the road;
a calculation unit which calculates an average value of the coordinates of the detection starting positions acquired by the acquisition unit and an average value of the coordinates of the detection ending positions acquired by the acquisition unit and which stores the information of radar detection including the calculated average values in the radar detection storage unit;
a comparison unit which compares the average value of the coordinates of the detection starting positions indicated by the information of radar detection stored in the radar detection storage unit with a determined reference value for the detection starting positions and which compares the average value of the coordinates of the detection ending positions indicated by the information of radar detection stored in the radar detection storage unit with a determined reference value for the detection ending positions; and
an abnormality determination unit which determines on the basis of results of the comparisons by the comparison unit whether or not an abnormality has occurred in the radar and which outputs, in the case of determining that an abnormality has occurred in the radar, information indicative of occurrence of the abnormality, and
a monitoring apparatus which stores, at the time of receiving the information indicative of the occurrence of the abnormality from the abnormality determination unit, information indicative of the abnormality in the radar.

11. A radar detection method which causes a computer to perform:
acquiring coordinates of a detection starting position and coordinates of a detection ending position detected by a radar, for each of a plurality of moving vehicles moving in a moving direction on a road, the radar provided so as to have a detection area in the moving direction on the road;
calculating an average value of the coordinates of the detection starting positions acquired and an average value of the coordinates of the detection ending positions acquired and storing the calculated average values;
comparing the stored average value of the coordinates of the detection starting positions with a determined reference value for the detection starting positions and comparing the stored average value of the coordinates of the detection ending positions with a determined reference value for the detection ending positions; and
determining on the basis of results of the comparisons whether or not an abnormality has occurred in the radar.

* * * * *